United States Patent
Farina et al.

(10) Patent No.: US 9,036,048 B2
(45) Date of Patent: May 19, 2015

(54) COMPOUND CAMERA SENSOR AND RELATED METHOD OF PROCESSING DIGITAL IMAGES

(71) Applicant: STMicroelectronics S.r.l., Agrate Brianza (IT)

(72) Inventors: Marco Farina, Pavia (IT); Mirko Ignazio Guarnera, San Giovanni La Punta (IT); Massimo Mancuso, Monza (IT); Giuseppe Messina, Catania (IT); Alessandro Capra, Gravina di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 13/867,866

(22) Filed: Apr. 22, 2013

(65) Prior Publication Data
US 2013/0229540 A1    Sep. 5, 2013

Related U.S. Application Data

(63) Continuation of application No. 12/288,626, filed on Oct. 21, 2008, now Pat. No. 8,436,909.

(51) Int. Cl.
*H04N 5/232* (2006.01)
*H04N 9/04* (2006.01)
*H04N 9/09* (2006.01)

(52) U.S. Cl.
CPC ........... *H04N 5/23238* (2013.01); *H04N 9/045* (2013.01); *H04N 9/09* (2013.01)

(58) Field of Classification Search
USPC .............. 348/223.1, 234, 222.1, 260, E9.052, 348/218.1, 239; 382/162, 299, 300, 312, 382/284; 345/629, 660
See application file for complete search history.

(56) References Cited

U.S. PATENT DOCUMENTS

| | | | |
|---|---|---|---|
| 4,558,365 A | 12/1985 | Ochi | |
| 4,602,289 A | 7/1986 | Sekine | |

(Continued)

FOREIGN PATENT DOCUMENTS

EP    1 486 916 A1    12/2004

OTHER PUBLICATIONS

Choi et al., "New Autofocusing Technique Using the Frequency Selective Weighted Median Filter for Video Cameras," IEEE Transactions on Consumer Electronics, vol. 45(3), Aug. 1999, 8 pages.

(Continued)

*Primary Examiner* — Roberto Velez
*Assistant Examiner* — Yih-Sien Kao
(74) *Attorney, Agent, or Firm* — Seed IP Law Group PLLC

(57) ABSTRACT

In one embodiment, a light sensor includes four cell arrays, one for each color of the Bayer pattern, and four lenses each focusing the light coming from the scene to be captured on a respective cell array. The lenses are oriented such that at least a second green image, commonly provided by the fourth cell array, is both horizontally and vertically shifted (spaced) apart by half a pixel pitch from a first (reference) green image. In a second embodiment, the four lenses are oriented such that the red and blue images are respectively shifted (spaced) apart by half a pixel pitch from the first or reference green image, one horizontally and the other vertically, and the second green image is shifted (spaced) apart by half a pixel pitch from the reference green image both horizontally and vertically.

14 Claims, 23 Drawing Sheets

(56) References Cited

U.S. PATENT DOCUMENTS

| | | | |
|---|---|---|---|
| 5,812,322 A | 9/1998 | Meyers | |
| 6,053,408 A | 4/2000 | Stoner | |
| 6,073,851 A * | 6/2000 | Olmstead et al. | 235/462.45 |
| 6,137,535 A | 10/2000 | Meyers | |
| 6,236,434 B1 | 5/2001 | Yamada | |
| 6,678,000 B1 | 1/2004 | Sakata | |
| 6,753,906 B2 | 6/2004 | Shimada | |
| 6,765,617 B1 | 7/2004 | Tangen et al. | |
| 6,782,143 B1 | 8/2004 | Dube et al. | |
| 6,803,949 B1 | 10/2004 | Kitagawa | |
| 6,958,862 B1 | 10/2005 | Joseph | |
| 6,983,080 B2 | 1/2006 | Wenstrand et al. | |
| 7,065,256 B2 | 6/2006 | Alon et al. | |
| 7,260,277 B2 | 8/2007 | Messina et al. | |
| 7,262,799 B2 * | 8/2007 | Suda | 348/280 |
| 7,305,123 B2 | 12/2007 | Messina et al. | |
| 7,702,229 B2 * | 4/2010 | Schilling-Benz et al. | 396/111 |
| 2002/0110282 A1 | 8/2002 | Kraft et al. | |
| 2002/0122124 A1 | 9/2002 | Suda | |
| 2003/0063201 A1 * | 4/2003 | Hunter et al. | 348/241 |
| 2003/0081132 A1 | 5/2003 | Kuno et al. | |
| 2004/0196379 A1 | 10/2004 | Chen et al. | |
| 2005/0128335 A1 * | 6/2005 | Kolehmainen et al. | 348/340 |
| 2005/0128509 A1 | 6/2005 | Tokkonen et al. | |
| 2006/0087567 A1 | 4/2006 | Guarnera et al. | |
| 2006/0093234 A1 | 5/2006 | Silverstein | |
| 2006/0132639 A1 * | 6/2006 | Page | 348/335 |
| 2008/0043125 A1 | 2/2008 | Kozlowski | |
| 2008/0079839 A1 * | 4/2008 | Sung et al. | 348/345 |
| 2008/0240203 A1 | 10/2008 | Baqai et al. | |

OTHER PUBLICATIONS

Gonzalez et al., "Digital Image Processing," Prentice Hall, Second Edition, Jan. 15, 2002, 18 pages.

Kim et al., "*Winscale*: An Image-Scaling Algorithm Using an Area Pixel Model," IEEE Transactions on Circuits and Systems for Video Technology, Obtained necessary references for IDS 1449; prepared IDS 1449 and IDS transmittal; transfered to legal assistant for review. vol. 12(6), Jun. 2003, 5 pages.

Nagashima et al., "New camera module with thin structure, high resolution and distance-detection capability," Proceedings of SPIE, vol. 6196, 2006, 8 pages.

Omori et al., "High Resolution Image Using Several Sampling-Phase Shifted Images—Density Doubling of Single Chip Color CCD with Pixel-Shift Technique," Digest of Technical Papers, International Conference on Consumer Electronics, Los Angeles, CA, 2000, 2 pages.

Oyama et al., "Distance Detective Small Camera Module," Sensors, Cameras, and Systems for Scientific/Industrial Applications VIII, Proceedings of SPIE-IS&T Electronics Imaging, vol. 6501, 2007, 8 pages.

Wang et al., "On the Euclidean Distance of Images," IEEE Transactions on Pattern Analysis and Machine Intelligence, vol. 27(8), Aug. 2005, 6 pages.

* cited by examiner

COMPOUND CAMERA SENSOR AND RELATED METHOD OF PROCESSING DIGITAL IMAGES

BACKGROUND

1. Technical Field

This disclosure relates to digital image processing and more particularly to a compound camera sensor for taking pictures of a scene to be captured with a desired depth of field and a method of processing images taken by the compound camera sensor.

2. Description of the Related Art

A compound camera consists of a set of component cameras, a data processor and an image processing software that runs on the data processor. The component cameras may be synchronized through wired or wireless electronic signals. Individual images from the component cameras are transmitted to the data processor through wired or wireless connections. The image processing software takes images from the component cameras as input and synthesizes an output image following the specifications of a virtual camera.

A conventional compound camera may be implemented in different ways. In a first conventional embodiment, a compound camera may comprise a number of synchronized regular video cameras and a separate microprocessor connected to the video component cameras. In a second conventional embodiment, a plurality of component image sensors and a microprocessor may be integrated on a substrate, such as a printed circuit board (PCB) or a hybrid substrate. Synchronization and communication are accomplished through connections on the substrate. In a third conventional embodiment, the component image sensors and the microprocessor are very small and are integrated on a single silicon chip.

The physical model of a camera consists of a shutter, a lens and an image plane. The shutter has an aperture that lets light enter into the camera. A bundle of light rays coming out of a point on an object surface enters through the aperture, is refracted by the lens, and is gathered and focused on the image plane, where the color of the object point is recorded.

For a certain aperture size, there is a range of field depths within which the image is sharp. This is called the "depth-of-field" and it is inversely proportional to the aperture size. The image plane slides back and forth to search for the best overall image within the range of the depth-of-field. Normally, a large depth-of-field coverage is desired. This, in turn, requires high sensitivity from the sensor because the aperture size is proportionally small.

Traditional cameras rely on complex optical and mechanical components to modify focus and aperture. Dimensional constraints limit the maximum resolution a camera can achieve. An enhancement of the camera performance may be implemented digitally by running an image processing software on the embedded microprocessor.

A brief survey on the main approaches for obtaining digital color pictures is presented hereinbelow.

Multi-Sensor Compound Camera Approach

As many separate sensors with M*N pixels are considered as the number n of required color channels (e.g.: 3 sensors for RGB or 4 sensors for special high-quality applications). Light from the scene is opto-mechanically separated into color components and then directed to sensors through a properly designed set of beam-splitting prisms. Such a solution maximizes image quality because no color interpolation is needed because all M×N×n pixel color components are directly available. Moreover the system can achieve outstanding detail with highly accurate color reproduction suitable for the demands of high-end video production—wide dynamic range, low color noise, high-contrast detail, natural color resolution and low-aliasing.

High costs due to the number of sensors and the complexity of the opto-mechanical part is a drawback of this solution.

A sub-pixel shifting among the n images of n sensors can be realized mechanically, exploiting it for enhancing image resolution beyond M*N and improving quality.

This technique is frequently used in the high-end market of top-quality video cameras. Present video camera technologies are listed below, wherein the pixel shifting technique coupled to the use of three sensors permits to achieve a ×2 or even more zoomed high quality picture:

JVC Pixel Shift technology;
3CCDs (RGB) 1.3 MP;
resolution enhancement to 5 MP images;
beam-splitting prism;
CANON Super Pixel Shift technology;
3CCDs (RGB);
beam-splitting prism (10-1 pixel Precision); and
SONY 3CMOS Videocamera DCR-PC1000.

Classical One-Sensor Approach

Only one sensor is used where a pattern-shaped filter (e.g. Bayer pattern) is present between the lens and the sensor. In such an approach not all M*N*n are available but only M×N with distribution defined by the filter pattern. Compared to a multi-sensor compound camera approach this classical solution has a much lower cost but image quality is inferior because color interpolation algorithms are used for reconstructing the missing M*N*(n−1) pixel color components.

Nevertheless this is a "standard" solution for consumer market cameras because it represents a good compromise among cost, image quality and size of the image acquisition device (sensor+optics).

One-Sensor Compound Camera Approach

One sensor, divided into n regions (4 regions for RGB) is used. The light coming from the scene to be captured is directed identically over all n regions. The filter pattern as depicted in FIG. 1 is much simpler because the color is uniform over each region. Moreover for optical reasons that will become clear hereinafter, the "thickness" (dimension along the optical axis) of such a system can be significantly reduced. Compared to the classical one-sensor approach, the size of each of the n images corresponding to different areas and different colors is a fraction of the entire sensor size (say M/2*N/2 in case of 4 regions) and appropriate image processing algorithms (zooming, super resolution) must be used to obtain a full (M*N) resolution image.

In analogy to the compound camera multi-sensor approach, the light directed towards the n sub-regions can be shifted by a pixel fraction both in x and y directions. Information obtained by sub-pixel shifting can be exploited for enhancing resolution of the final M*N image and improving image quality.

One degree of freedom in designing the sensor for a compound camera is related to the fourth color channel. In general, the following options exist:

in case of RGB color approach, the fourth channel is used for a second green channel;

in case of a four-color system (e.g. Cy Ye G Mg), each channel is used for different color;

the fourth channel is used without any color filter.

In the ensuing description the first case of a RGB color camera will be considered however the considerations that will be made in describing this disclosure hold mutatis mutandis also for the other two options.

A review of known architectures and related algorithms for one-sensor compound camera with sub-pixel shifting follows.

Together with the image processing pipeline for treating the signals output by a compound camera sensor, a brief description of the distinguishing features of the compound camera sensor is given because the algorithms executed in the processing pipeline are strictly related to sensor configuration and to its physical properties.

Relevant publications are here below identified and briefly commented for outlining the main aspects of each technology.

Nokia US 2005/0128335

Four QVGA areas corresponding to red R, green G1, blue B (or CyMgYe) and green G2 channel, respectively, are contemplated. The G2 channel may be substituted by a filter-less area sensitive only to light intensity.

It is compatible with both CCD and CMOS sensor technologies.

First a sub-images alignment through parallax correction is performed, then one of the following steps is performed:

interpolation to VGA of the missing color component+merging of color components; or merging of color components into an artificial Bayer pattern+interpolation to VGA of missing color values.

The solution is specifically developed for VGA image.

Nokia US 2005/0128509

Several alternatives are disclosed:

two sensor areas;

four sensor areas of different sub-array configuration in color distribution or in the pixel size.

The image processing pipeline performs:

alignment with parallax correction+interpolation to VGA+merging; or alignment with parallax correction+merging+interpolation to VGA.

The solution is specifically developed for VGA images.

Different device structures or sensor area assignments are proposed, in some cases the pixel size for the green channel is smaller than that for red and blue pixels.

Agilent U.S. Pat. No. 6,983,080

Multiple shots of the same scene are taken with a common camera;

resolution of each image is enhanced;

motion vectors are estimated;

a high resolution image is reconstructed exploiting estimated motion vectors;

sub-pixel shift is considered in some cases but as a motion vector;

a super resolution algorithm is used for enhancement of the green channels through the estimation of a motion vector among G1 and G2 sub-arrays as if they where two successive frames of a movie;

reconstruction of an artificial Bayer Pattern is contemplated.

Canon U.S. Pat. No. 6,753,906

Orthogonal mirror plates moved by electromagnets create 9 different optical paths for a 3×3 shift matrix with ⅓ pixel pitch;

a CyYeGMg color filter is used;

6 images are stored in the memory corresponding to different positions of the mirror plates and therefore having a different shift of a fraction of a pixel pitch;

an artificial Bayer Pattern is used for enhanced resolution image reconstruction;

multiple images of the same scene are taken through multiple shots corresponding to multiple configuration of the opto-mechanical shifting device.

Canon U.S. Pat. No. 6,803,949

The sensing procedure senses if the image is black and white or a color image;

4 shots of the same scene are taken with the same CCD and four images are stored in memory;

an artificial BP is reconstructed and interpolated for enhancing resolution;

½ pixel shifting is performed four times;

artificial BP reconstruction;

channel shifts (1/2, 0) (1/2,1) (3/2,0) (3/2,1).

Canon U.S. Pat. No. 6,678,000

A ±⅔ pixel shifting optical device performs 9 shifts;

9 frames of the same scene are stored;

each shot is taken with an RGB CFA sensor;

an image enhanced by a factor 3 is obtained

ST US 2004/0196379

Several shots of the same scene are taken with different video-cameras;

images are combined for increasing depth of field low quality images are combined for obtaining an enhanced one video processing of images is disclosed.

Kodak U.S. Pat. No. 5,812,322

Each lenslet has a different field of view;

all the sub-images are stitched together;

three levels of lenslets to reduce "banding" effects;

numerous lenslets to reduce thickness;

final FOV is obtained as a stitched artwork of all the lenslets sub-images.

Kodak U.S. Pat. No. 6,137,535

Each lenslet of the array is oriented such to reduce parallax errors;

each lenslet has a different field of view;

all sub-images are stitched together;

numerous lenslets (up to 150×100) are employed to reduce thickness;

each sub area of the sensor is provided with a Bayer pattern color filter.

Telxon Corporation U.S. Pat. No. 6,053,408

A dataform reader with different lens systems, each focusing at a fixed distance and the sharpest image from the plurality of images taken of the same scene to be captured is selected;

the output image is reconstructed using only the selected image;

an array of separated common optical systems is used.

Tangen et al. U.S. Pat. No. 6,765,617

A set of images is obtained through a multi-lenslet system;

sub-images of the same scene but at lower resolution than the full size image are obtained;

each sub-image can sample a single color and final RGB data can be obtained by combining sub-images;

each pixel in the sub-areas is positioned in a way that there is not overlapping in any of the four sub-images;

the lenslet system is used to reduce local density of photo-detectors: i.e. k lenslets may reduce density to 1/k of the original needs;

lenslet are used to reduce sensor resolution.

Foveon U.S. Pat. No. 6,958,862

Four sub-images shifted from each other are obtained;

each pixel is acquired in RGB according to a special technique;

due to shifting, the center of each sub image does not correspond to the center of the other images but they can be considered as pixels in a neighborhood of a given centre improving final resolution.

ST US 2004/0196379

A plurality of cameras arranged in a matrix disposition generate a plurality of images, however the images are not identical because the cameras are relatively close to objects of the scene, thus parallax effects are relevant;

each camera has a different representation of the scene depending on the angle between the ray from a point of an object to the image plane of each camera sensor;

a new synthetic image is generated by a video processor using the taken images;

different images of the same scene allow to calculate point-to-point differences to be used for enhancing resolution.

For small pocketable cameras destined for the consumer market (e.g. the camera incorporated in cellular phone), the thinness (f1 in FIG. 2) of the camera device comprising the light sensor, filters, optics and mechanics is a key factor of appeal. In traditional arrangements (typically a one-sensor camera with a single lens and Bayer pattern filter) the minimum overall thickness that can be reached is determined by the focal length of the lens, the sensor size, the focus distance and final optical image quality that is required. Therefore, a substantial reduction of the overall thickness of the device can only be obtained by reducing the focal length of the lens. This is commonly obtained by reducing the sensor size and as a consequence reducing image quality because for the same pixel size the number of pixels must be reduced.

There is a persistent need in the art for more compact light sensors capable of generating color images of good quality of a scene to be captured and of methods for efficiently processing images generated by these light sensors.

There is also an attendant need for related processing means capable of generating images having an extended depth of field.

BRIEF SUMMARY

One embodiment is a novel light sensor of reduced thickness capable of generating RGB images of a quality comparable to that typical of more expensive multi-sensor compound cameras.

According to a first embodiment of the novel light sensor, there are four cell arrays, one for each color of the Bayer pattern (R G1 G2 B), and as many lenses each focusing the light coming from the scene to be captured on a respective cell array. The lenses are oriented such that at least a second green image, commonly provided by the fourth cell array, is both horizontally and vertically shifted (spaced) apart by half a pixel pitch from a first (reference) green image.

According to a second alternative embodiment of light sensor, the four lenses are oriented such that the red and blue images are respectively shifted (spaced) apart by half a pixel pitch from the first or reference green image, one horizontally and the other vertically, and the second green image is shifted (spaced) apart by half a pixel pitch from the reference green image both horizontally and vertically.

The definition of the distinct captured images are enhanced by a factor of two and the enhanced green images are combined for obtaining a final N×M green image. The blue and red monochromatic images are corrected by adding thereto corresponding high frequency images calculated using the final N×M green image as reference image. The 2N×2M output RGB image is obtained by combining the final green, red and blue N×M images.

One embodiment is a method of generating a 2N×2M Bayer image by capturing four N×M monochromatic images with a single shot using the above described light sensor of this disclosure and by reconstructing the Bayer image by juxtaposing the pixels of the four N×M monochromatic images according to a Bayer pattern.

One embodiment is a novel light sensor capable of generating sharp images of enhanced depth of field compared to images obtainable with a single shot using known light sensors. To this aim the plurality of lenses facing a respective cell array onto which the light coming from a scene to be captured shines, are placed at different distances from the respective arrays such to define different depth of field ranges that are staggered, preferably without any gap among them.

According to an alternative embodiment, the lenses of the light sensor may even define staggered depth of field ranges with gap therebetween, provided that the light sensor include a consequent specifically adapted data processing pipeline for reconstructing the image. If a scene is taken with a depth of field not comprised in any depth of field range of the lenses, the pipeline will reconstruct a sharp image by selecting the sharper among the four images taken by the cell arrays and then it will reconstruct a corresponding color image of the scene by processing the selected image according to the point spread function of the four lens. In a light sensor composed of four lenses and four cell arrays, each cell array may be sensible to a color of the Bayer pattern, and preferably but not necessarily the four cell arrays are themselves disposed according to the Bayer pattern.

One embodiment is a method of generating a corrected Bayer image of 2N×2M pixels of a scene to be captured with a desired depth of field. Preferably, four monochromatic images may be taken with a single shot using a light sensor of this disclosure, then the sharpest image is identified with any suitable known analytical method. High frequency components of the sharpest image are extracted and are added to the other monochromatic images, then a corrected Bayer image is obtained by juxtaposing the pixels of the sharpest image to those of the corrected monochromatic images according to a Bayer pattern.

Other embodiments are defined in the annexed claims.

DETAILED DESCRIPTION

Figure 1:
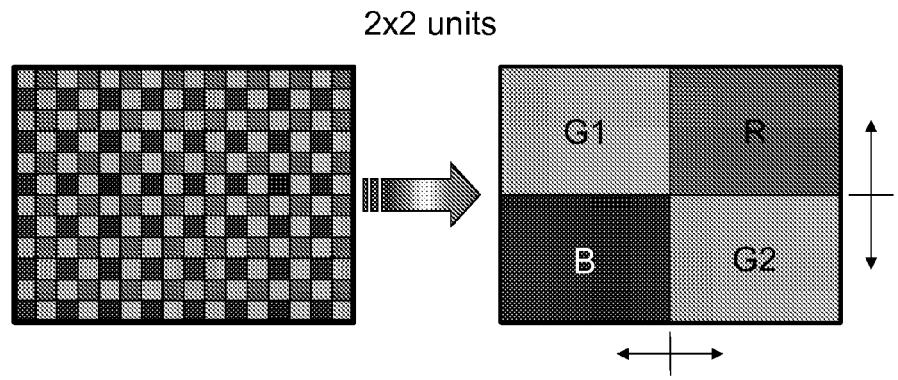
FIG. 1 compares a Bayer pattern generated by a typical Bayer sensor vs. a Bayer pattern obtained with a light sensor of one embodiment.
Figure 2:
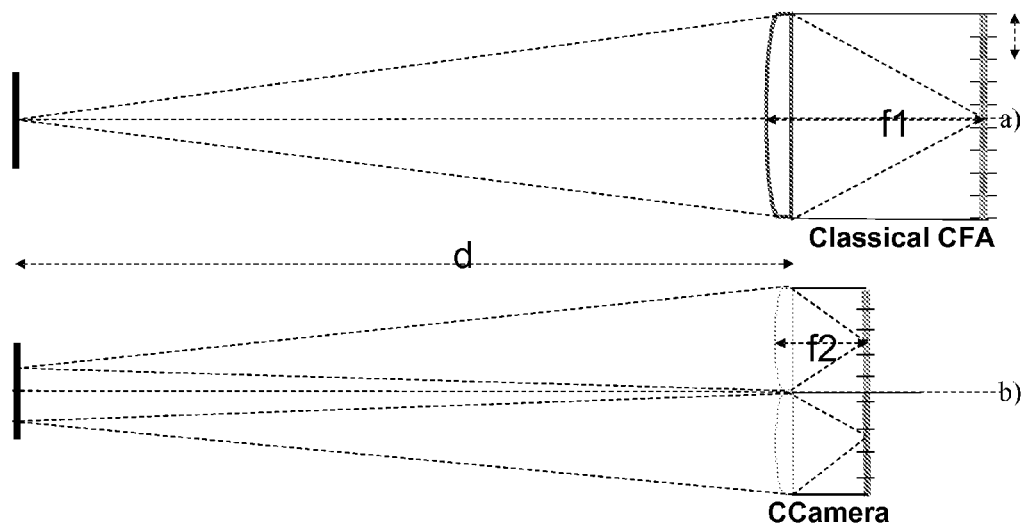
FIG. 2 is a schematic view of a) a typical sensor with one lens and a Bayer pattern color filter array; and b) a one-sensor camera with four lenses and four cell arrays corresponding to red R, green G1, green G2 and blue B channels.

According to a preferred embodiment, the light sensor of this disclosure has a reduced thickness (a reduced length along the optical axis of the device) because it employs four lenses, the focal length of which is halved, as shown in FIG. 2. The sensor device includes a pixel data processing pipeline that implements an algorithm capable of reconstructing an output color image of the enhanced quality.

Figure 3:
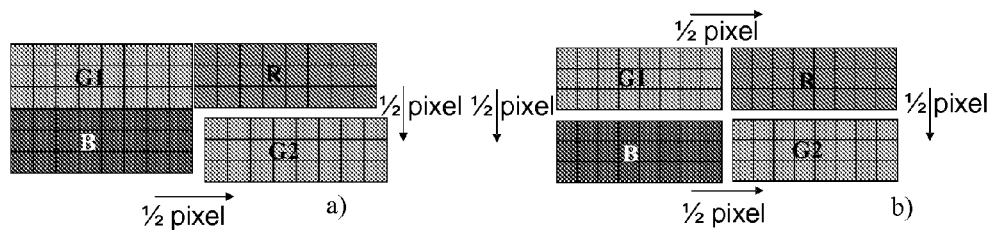
FIG. 3 illustrates two particularly effective ways of shifting the four monochromatic images generated by a light sensor of one embodiment.

According to an aspect of the sensor of such a preferred embodiment, the lenses of the light sensor are oriented in order to generate with a single shot four monochromatic images (two green images G1 and G2, a red image R and a blue image B, disposed according to a Bayer pattern), wherein at least the second green image G2 is shifted (spaced) apart from the other green image G1 by half of a pixel pitch in both horizontal and vertical direction, as shown in FIG. 3.

In general, the two alternative shifting (spacing) configurations among cell arrays requiring different image processing pipelines are:

G ½-pixel shift: the image captured by the G2 sub-array plane is shifted (spaced) by half a pixel pitch both in horizontal and in vertical direction with respect to the other green image G1, whilst the red R and blue B images are aligned with the green image G1 (FIG. 3a);

RGB ½-pixel shift: the three images captured by the three sub-arrays R, B and G2 are shifted (spaced) by (0, ½), (½, 0) and (½, ½) pixel with respect to the first green array image G1 (FIG. 3b).

The two alternative spacing configurations are schematically shown in FIG. 3 where the shifting, which is physically obtained by properly orienting the four lenses, is schematically represented as a physical spacing apart of the illuminated sensor areas.

Tests carried out by the applicant showed that shifting the second green image G2 by half of a pixel pitch is particularly beneficial in view of the step of magnifying the monochromatic images by 2 as would be contemplated in commonly known image processing pipelines for generating a 2N×2M RGB image by processing the four N×M monochromatic images of the exemplary embodiment considered.

Figure 4:
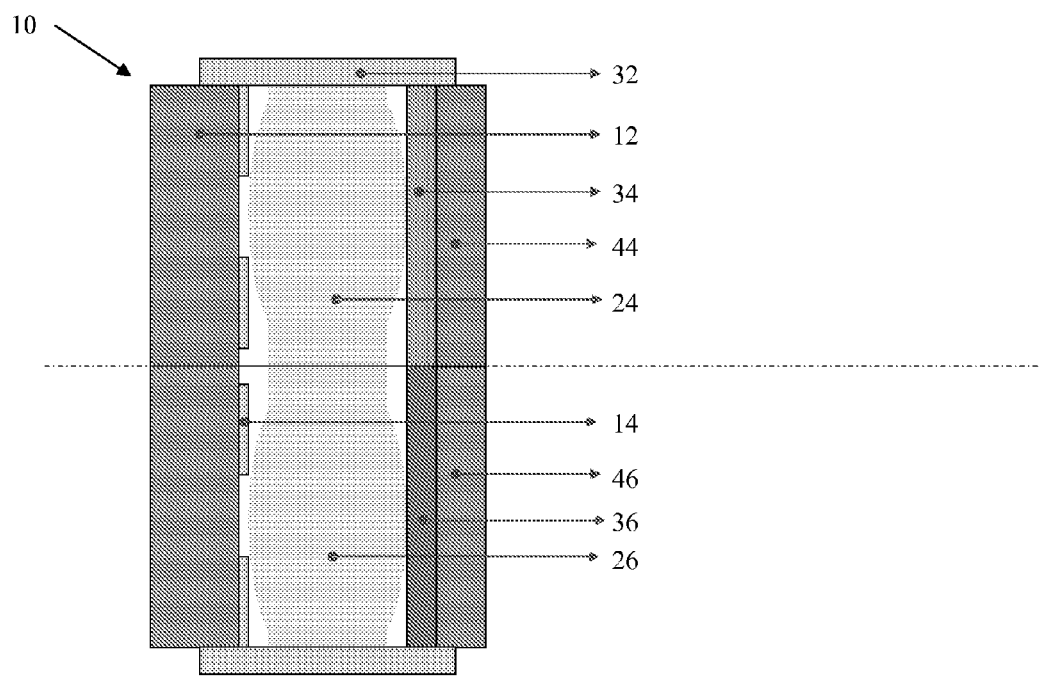
FIG. 4 is a cross-section view of a sensor of one embodiment.
Figure 5:
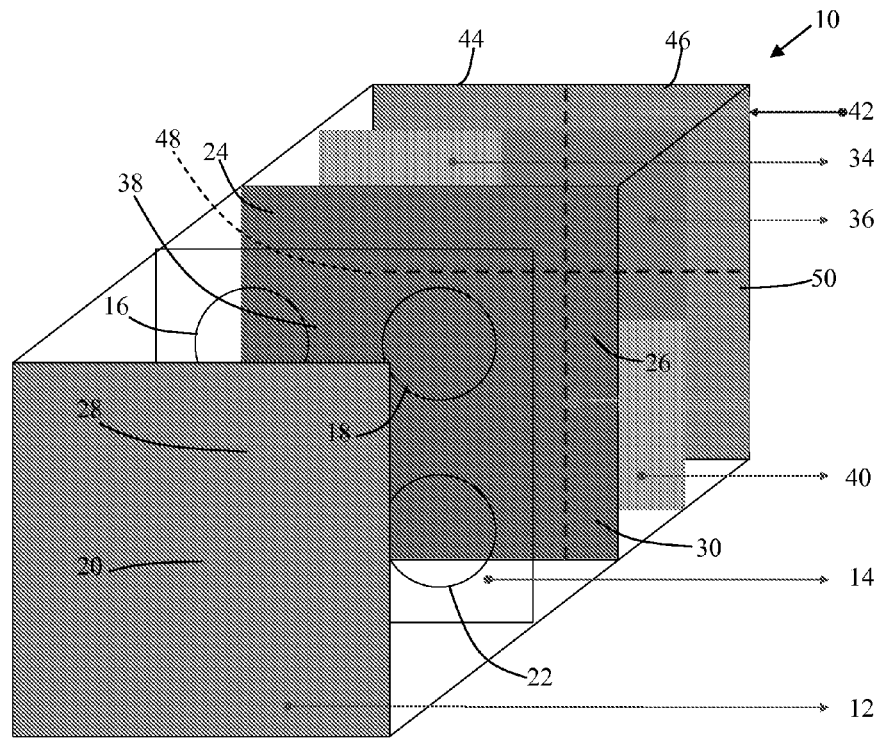
FIG. 5 is a perspective view of a sensor of one embodiment.

A description of functional blocks and their relative physical location is given hereinafter. A light sensor 10 according to one embodiment is shown in FIGS. 4-5. The light sensor 10 includes an infrared filter 12; an aperture plate 14 with four apertures 16, 18, 20, 22; four lenses 24, 26, 28, 30 corresponding to the four apertures 16-22, respectively; and opto-mechanics 32 for shifting one or more of the lenses 24-30 as discussed below.

The light sensor 10 also includes four color channel filters: a first green filter 34, a red filter 36, a blue filter 38, and a second green filter 40 corresponding to the four lenses 24-30, respectively. The light filtered through the four color channel filters 34-40 is directed onto a sensor, such as a CMOS sensor 42.

The CMOS sensor 42 is subdivided into four cell arrays 44, 46, 48, 50. The color filters 34-40 are uniform over the respective cell arrays 44-50 and correspond to the four different channels G1, R, B and G2. Therefore, there is no need for any Bayer pattern color filter as observable in FIG. 4 and FIG. 5.

The four lenses 24-30 direct light coming from the scene towards the four sub-areas such that the same image is impressed on the four cell arrays 44-50.

Hereinafter it is supposed that the objects represented in the scene are sufficiently far from the light sensor such that the four monochromatic images are unaffected by parallax errors. Should the object be very close to the camera, parallax errors cannot be neglected and algorithms may be preferably executed for filtering out unwanted parallax effects, leaving unchanged the purposely introduced shift by half a pixel pitch. The block 52 that may eventually perform this algorithm is optional and is indicated in the appended figures by the label PAR (FIGS. 7A, 7B), wherein the shifted picture is eventually compared with the reference picture G1 and unwanted parallax effects that may be present are filtered out. Clearly, in the G ½-pixel shift algorithm only the image G2 may be processed, and in the RGB ½-pixel shift algorithm also the blue B and the red R image may be processed.

Preferably, an individual aperture diaphragm and an infrared filter are located over each of the four lenses.

G ½-Pixel Shift

Human eyes are more sensitive to green light than to red or blue light. The green component of a video signal contains 60% of the picture detail whereas the red and blue components together contain the remaining 40%. For these reasons, the preferred choice is to replicate the green channel with a shift: a second green channel G2 provides additional information and its pixel shift permits to enhances the sharpness of a green channel G1.

Preferably, the channel shift is equal to half of the pixel pitch because tests showed that such a shift maximizes the amount of added high frequency information. The four channels, corresponding to the four sub-areas of the light sensor are therefore G1, R, B and G2, where R are B are aligned with G1 whilst G2 is shifted with respect to G1, R and B. Such configuration is schematically depicted in FIG. 3.

Two alternative different algorithms (pipelines) may be used for processing the four monochromatic images (algorithms A and B) as disclosed hereinafter referring to FIG. 6.

According to the first algorithm G ½-pixel shift A, a super resolution algorithm (disclosed in assignee's prior U.S. Pat. No. 7,260,277, the disclosure of which is herein incorporated by reference) is used for reconstructing a green image and the adaptive zooming (disclosed in assignee's prior U.S. Pat. No. 6,782,143, the disclosure of which is herein incorporated by reference) is used for R and B images.

According to the alternative algorithm G½-pixel shift B the adaptive zooming is used for all the four images and then the two green images G1 and G2 are merged together.

Both algorithms include a correction step of high frequency components.

Details of Algorithm A

Figure 7A:
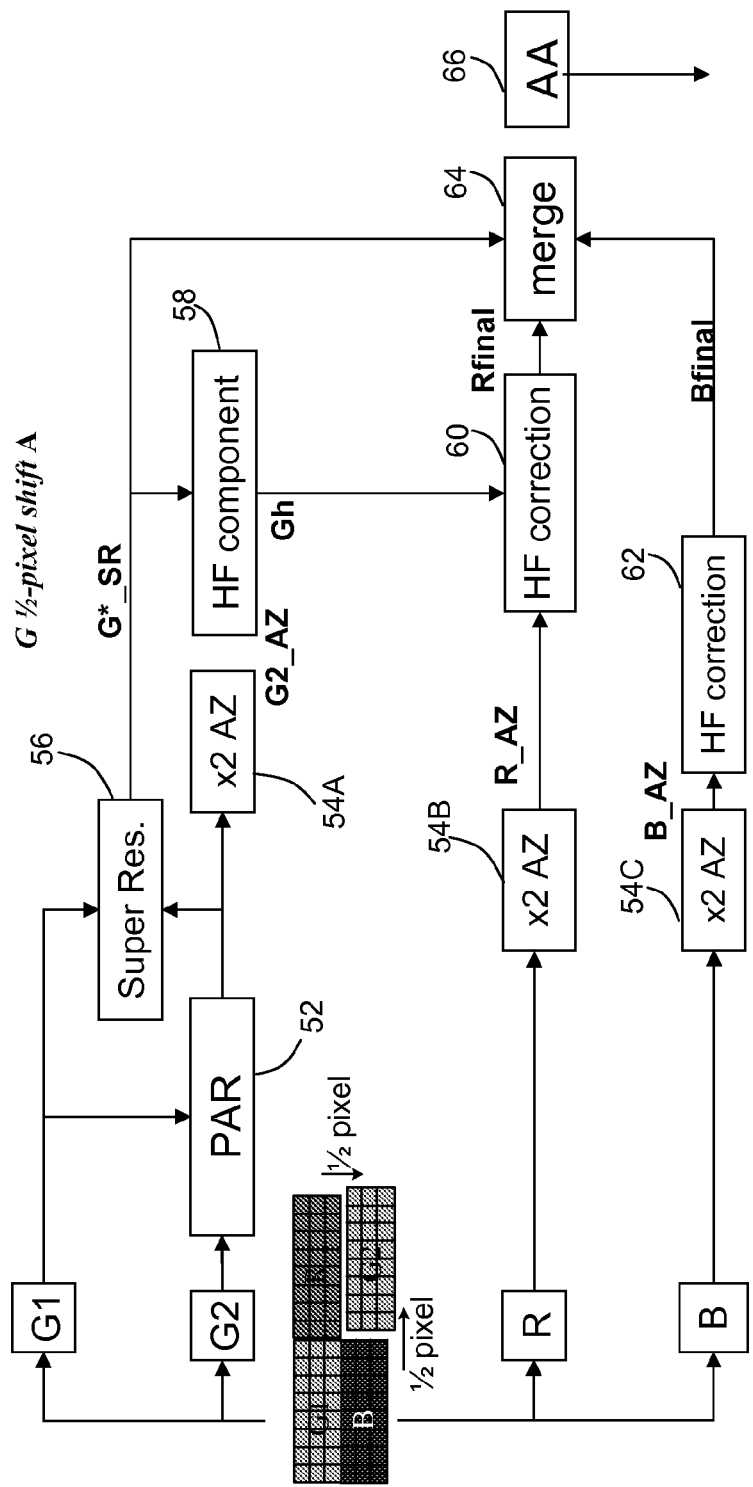
FIG. 7a depicts a pipeline for the method G ½-pixel shift A of one embodiment.

The steps of the preferred embodiment of this algorithm are schematically illustrated in FIG. 7A and include:

enhancing resolution by 2 of G2, R and B images with parallel adaptive zooming algorithm steps 54A,54B,54C obtaining enhanced green, red and blue images G2_AZ, R_AZ, and B_AZ, respectively;

enhancing resolution by 2 of the green images G1 and G2 by processing them as if they where successive frames of a video sequence to be treated by the super resolution algorithm 56, thus obtaining a final green image G*_SR;

obtaining a high frequency image Gh (step 58) for the green channel as follows:

$$Gh=G^*\_SR-G2\_AZ;$$

reconstructing the red and blue images Rfinal and Bfinal by adding the high frequency image Gh to the enhanced images R_AZ and B_AZ (steps 60, 62):

$$Rfinal=R\_AZ+Gh;\ Bfinal=B\_AZ+Gh;$$

assembling the final RGB image using the reconstructed red and blue images Rfinal and Bfinal and the final green image G*_SR (step 64).

As already stated hereinbefore, the block PAR is not necessary. It may conveniently be used for filtering out eventual unwanted parallax effects. The block AA represents the common anti-aliasing step 66.

Details of Algorithm B

Figure 7B:
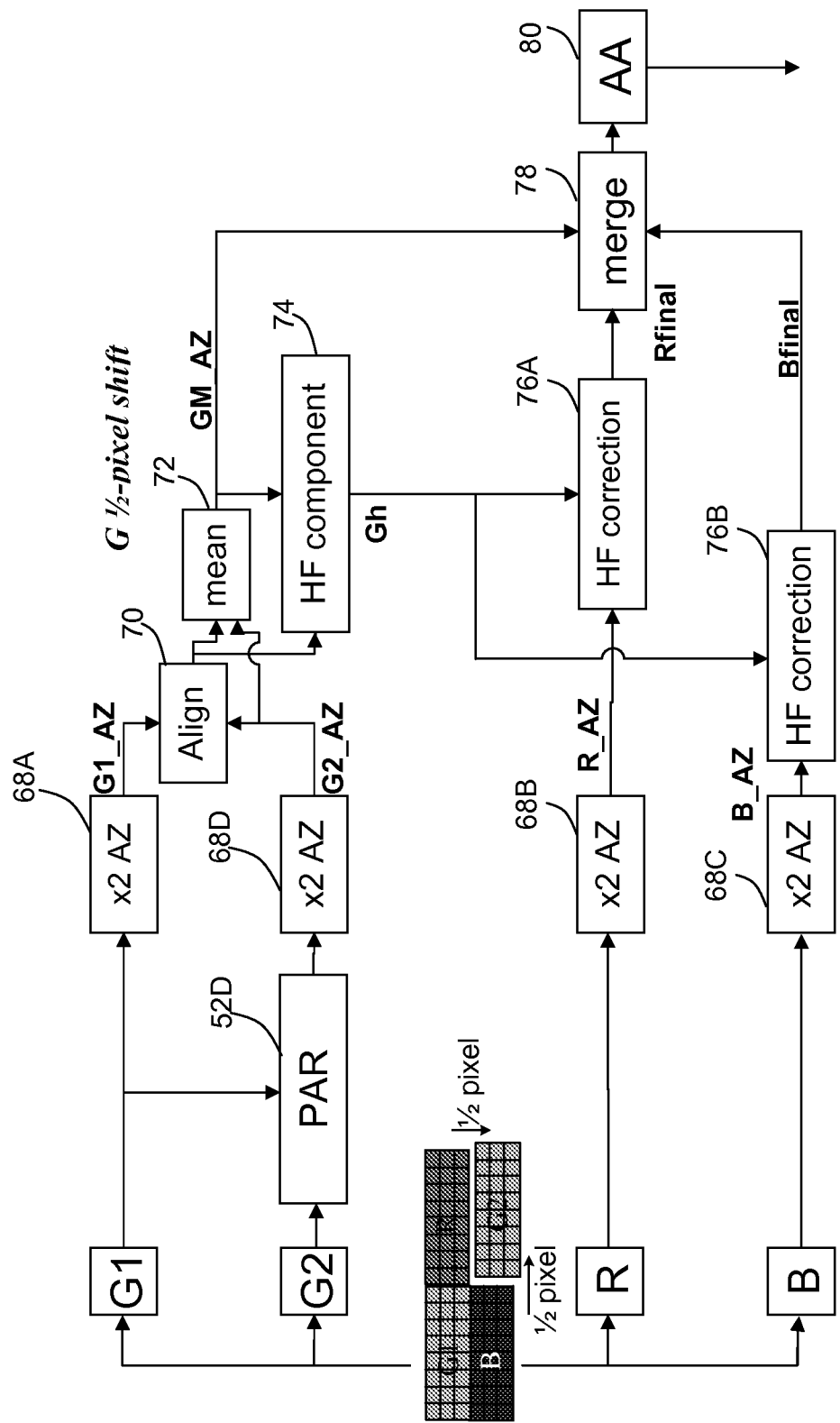
FIG. 7b depicts a pipeline for the method G ½-pixel shift B of one embodiment.

The steps of a preferred embodiment of this algorithm are schematically illustrated in FIG. 7b and are:

enhancing resolution by 2 of G1, R and B and G2 channels with parallel adaptive zooming algorithm steps 68A, 68B, 68C, 68D obtaining enhanced green, red and blue monochromatic images G1_AZ and G2_AZ, R_AZ, B_AZ;

aligning the enhanced green images G1_AZ to G2_AZ (step 70) and generating a final green image GM_AZ in step 72 by computing the average as follows:

$$GM\_AZ=(aligned(G1\_AZ)+G2\_AZ)/2;$$

estimating a high frequency green image Gh in step 74 as follows:

$$Gh=GM\_AZ-aligned(G1\_AZ);$$

reconstructing the red and blue images Rfinal and Bfinal in steps 76A, 76B by adding the high frequency image Gh to the enhanced images R_AZ and B_AZ:

$$Rfinal=R\_AZ+Gh;\ Bfinal=B\_AZ+Gh;$$

assembling the final RGB image in function of the final green image GM_AZ and of the enhanced images R_AZ and B_AZ (step 78). The block AA represents the common anti-aliasing step 80

In the present context, with the expressions "align", "alignment", "aligning", as referred to two or more pictures of the same scene, it is intended that when a picture is subjected to a shift by a fraction of a pixel pitch relative to the other(s), pixels that are to be considered homologous in the pictures are identified prior to eventually averaging or carrying out other operations on the so identified homologous pixels.

As already stated hereinbefore, the block PAR is not necessary. It may conveniently be used for filtering out eventual unwanted parallax effects.

RGB ½-Pixel Shift

Figure 8:
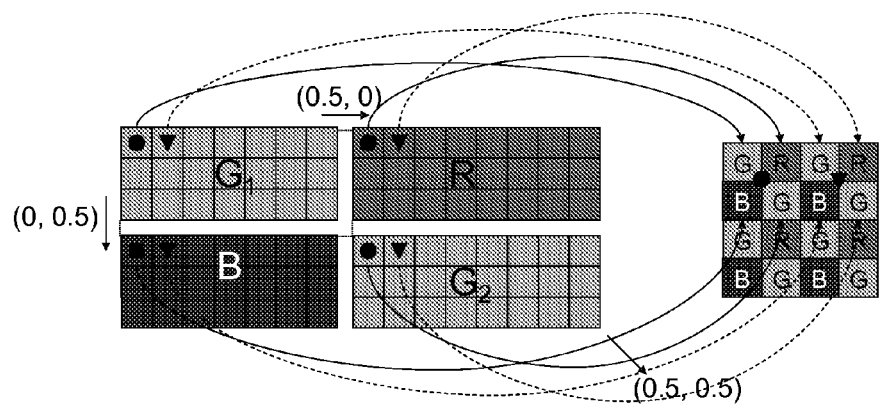
FIG. 8 illustrates how a synthetic Bayer pattern is reconstructed according to the RGB ½-pixel shift method of one embodiment.
Figure 9:
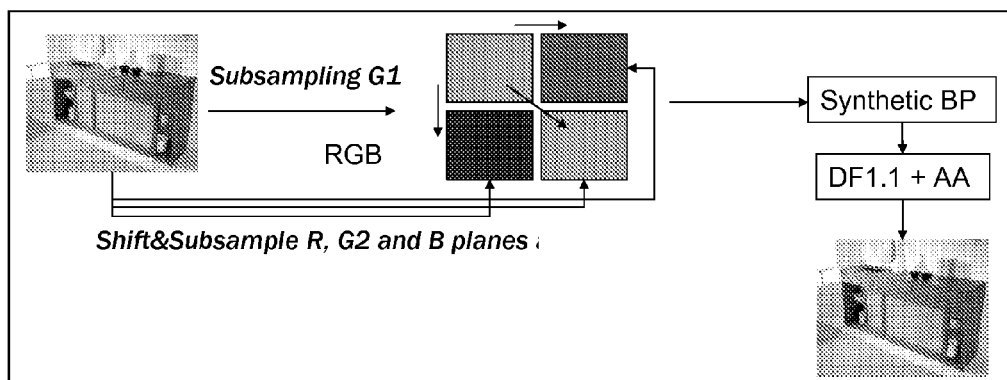
FIG. 9 is a flow-chart of the RGB ½-pixel shift method of one embodiment.

This alternative embodiment is shown in FIGS. 3, 8 and 9.

Figure 10:
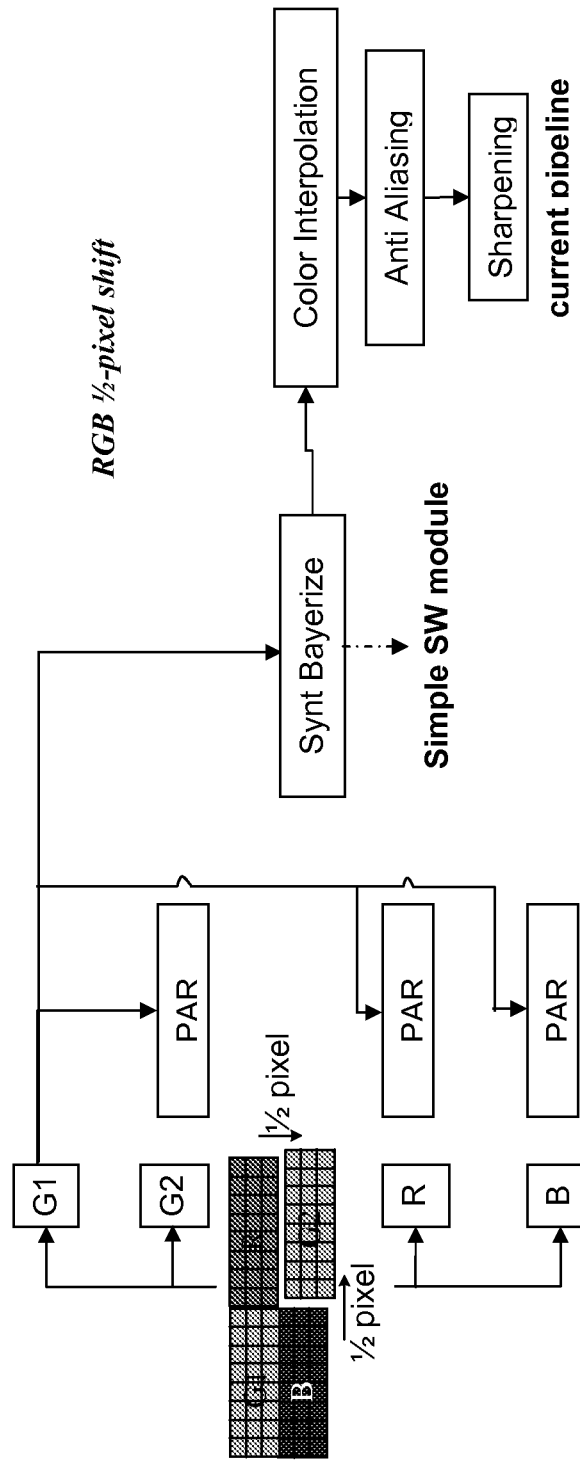
FIG. 10 is a high level block diagram of the pipeline for implementing the RGB ½-pixel shift method of one embodiment.

A processing pipeline for this case is illustrated in FIG. 10. The functioning of each block is of immediate recognition by any skilled person. The block SYNT BAYERIZE carries out the step illustrated in FIG. 8. As indicated in FIG. 9, the color interpolation preferably consists of a directional filtering step DF.

According to this embodiment, the introduction of a shift of half a pixel pitch among the monochromatic images R, B and G2 is particularly advantageous because it greatly simplifies the execution of the step SYNT BAYERIZE for generating a Bayer pattern.

Figure 11:
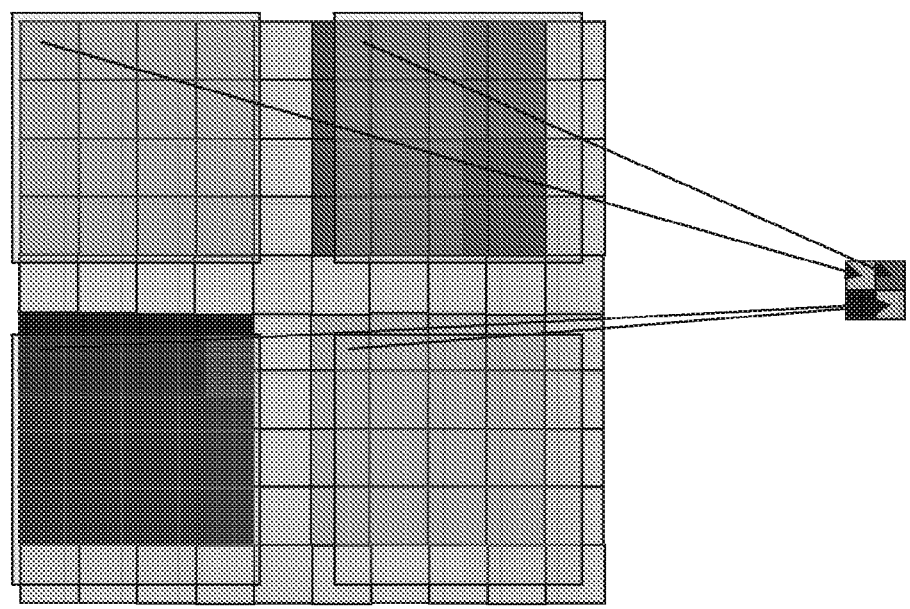
FIG. 11 illustrates a cell array for generating four monochromatic images wherein the four lenses are oriented such to generate a red, blue and a green monochromatic images shifted in respect to a reference green image.

As illustrated in FIG. 11, which depicts a cell array for generating four monochromatic images G1, R, B and G2, being the images R, B and G2 shifted by half a pixel pitch in respect to the green image G, the first row of the Bayer image is the first row of the green G1 and red R images, the second row of the Bayer image is the first row of the blue B and green G2 images, the third row of the Bayer image is the second row of the green G1 and red R images and so on. Therefore, the synthesis of the Bayer image becomes very simple.

Waiting for the first prototypes of a light sensor according to this disclosure, performances of the novel sensor according to this particularly effective embodiment have been simulated as follows.

The four monochromatic images of a scene to be captured, that the sensor of FIG. 4 would take with a single shot when exposed to the light coming from the scene, were reconstructed by processing a full-resolution high-quality image chosen from a database of images. Such a full-resolution high-quality image could be a Hi-End SLR TIFF image or a synthetic image or a Kodak test image.

The four reconstructed images were then processed according to the methods of this disclosure and the resulting color images compared with a respective low-quality reference image LQ and a high-quality reference image HQ that would be obtained with a typical one-sensor camera with color interpolation. The low-quality reference image was obtained using only one green image in the color interpolation algorithm, the high-quality reference image was obtained using both green images in the color interpolation algorithm. From this comparison, performances of the methods of this disclosure could be determined.

The four monochromatic images were reconstructed neglecting the parallax error. Therefore, objects represented in the image are assumed to be sufficiently far from the light sensor such that the parallax effect becomes negligible.

Figure 12:
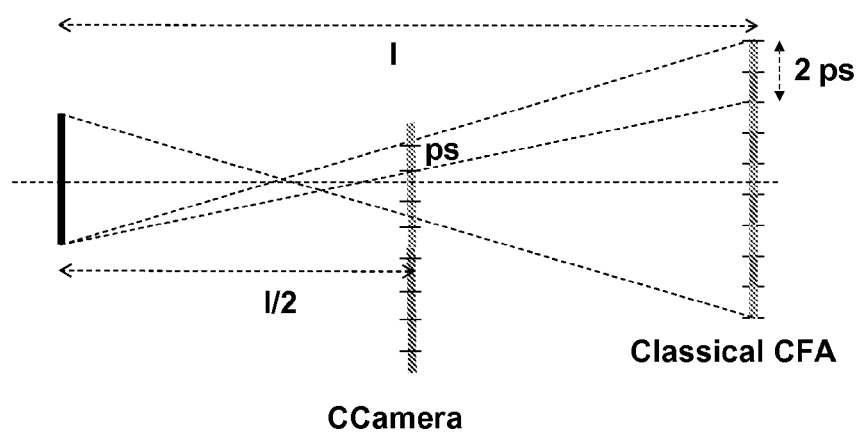
FIGS. 12 and 13 illustrate how the functioning of a light sensor of one embodiment is simulated.
Figure 13:
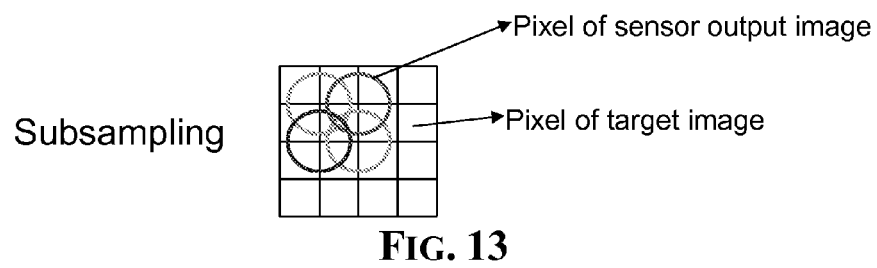

FIGS. 12 and 13 illustrate how each pixel of the four N×M monochromatic images were reconstructed from the pixels of the original 2N×2M full-resolution high-quality image.

The number of pixels of each of the four monochromatic images is one fourth of the number of pixels of the full-resolution high-quality image.

Given that the pixel pitch is the same in the monochromatic images and in the full-resolution high-quality image, and that the latter image is generated by a cell array located at distance l from the lens, looking at FIG. 12, each monochromatic image can be generated by placing the cell array of the light sensor of this disclosure between (at distance l/2) the lens and the cell array of the full-resolution high-quality CFA, such that the light impinging on four pixels of the array of the CFA impinges on a single pixel of the cell array of the light sensor of this disclosure.

Therefore, as schematically illustrated in FIG. 13, each pixel of each monochromatic image is reconstructed by sub-sampling and averaging four adjacent pixels of the full-resolution high-quality image.

The quality of a reconstructed image obtained with the light sensor of this disclosure is expected to be comprised between the quality of the high-quality reference image HQ and the quality of the low-quality reference image LQ.

Color Interpolation without G2 for the Low-Quality Reference Image

Figure 14:
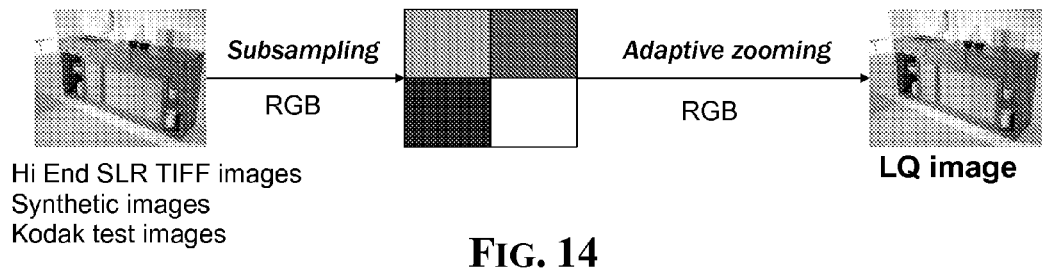
FIG. 14 schematically illustrates how the low quality image BQ is obtained.

The RGB color channels of the target image are first down-sampled, then a ×2 adaptive zooming algorithm for enhancing resolution is applied without using the green image G2, as shown in FIG. 14. The ×2 adaptive zooming resolution enhancement is carried out on monochromatic images using a proprietary adaptive zooming algorithm as disclosed in the prior U.S. Pat. No. 6,782,143 B1. This step is important to prevent worsening of the sharpness of the image.

Bayer Pattern Sensor Pipeline for the High-Quality Reference Image

Figure 15:
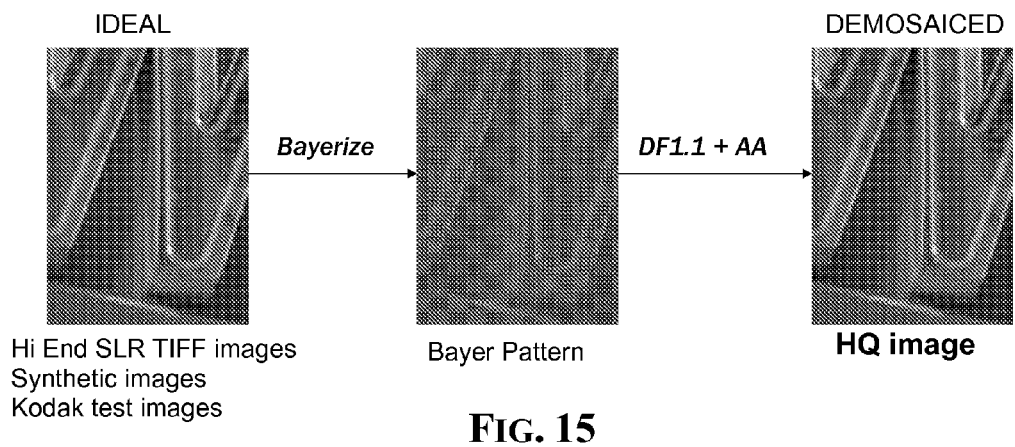
FIG. 15 illustrates how the high quality reference image HQ is obtained.

As already mentioned, for a fair evaluation of the performance of the compound camera sensor and related image processing method of this disclosure, the high-quality reference images are demosaiced images and not initial full-resolution high-quality images. As for the low-quality reference image, the corresponding Bayer image is reconstructed from the initial image using also the second green image G2, and from the Bayer image the high-quality reference image is obtained through a color interpolation algorithm including an antialiasing step AA, as schematically illustrated in FIG. 15.

This high-quality reference image is assumed to correspond to the image that would be generated by a typical one-sensor camera with color interpolation.

In order to test the performance of the novel light sensor of this disclosure, that generates four monochromatic images according to a Bayer pattern spaced one from the other by half of a pixel pitch, the functioning of the sensor has been simulated with the following interpolation technique.

Area Interpolation Technique

Each monochromatic image was reconstructed by processing a full-resolution high-quality image of the scene chosen from a database of images.

Figure 16:
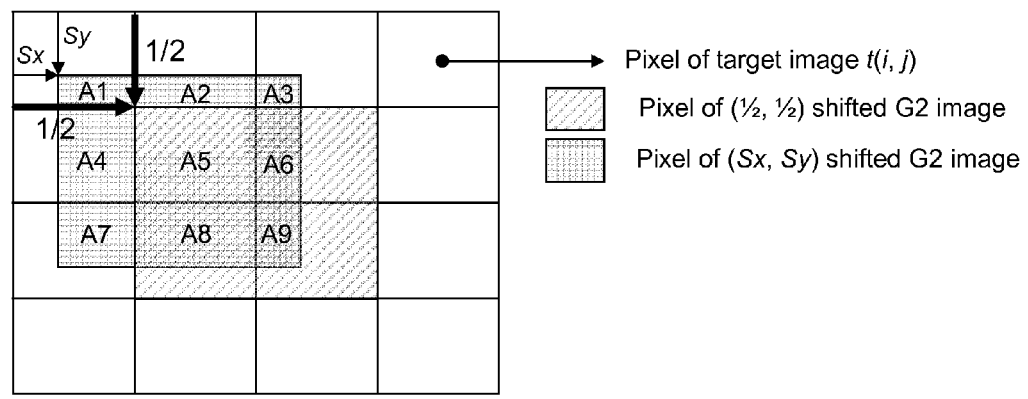
FIG. 16 illustrates how weights are computed according to the area pixel technique.

In order to explain how each monochromatic image was reconstructed, let us refer to FIG. 16, which depicts sixteen pixels $t(i, j)$ of the full-resolution high-quality image, and let us suppose of being reconstructing the second green image G2 of FIG. 3.

A pixel of the reconstructed green image G2 shifted by half of a pixel pitch both horizontally and vertically and a pixel of the reconstructed green image G2 shifted by a generic fraction of the pixel pitch are depicted in FIG. 16. As explained hereinbefore referring to FIGS. 12 and 13, the area of each pixel of the reconstructed N×M monochromatic image corresponds to four times the area of a pixel $t(i, j)$ of the 2N×2M full-resolution high-quality image. Therefore, shifting by half a pixel pitch in the reconstructed image corresponds to shifting by one pixel pitch in the full-resolution high-quality image.

Let us suppose that the pixel to be reconstructed is shifted by a generic fraction of a pixel pitch of the reconstructed image. Each reconstructed pixel is obtained by a weighted mean of the pixels of the full-resolution high-quality image that overlap at least partially with the textured square. The areas A1 to A9 are the weights and are calculated in function of the shifts according to the following equation:

$$\begin{bmatrix} A1 & A2 & A3 \\ A4 & A5 & A6 \\ A7 & A8 & A9 \end{bmatrix} = \frac{1}{4} \begin{bmatrix} (1-Sx)\cdot(1-Sy) & (1-Sx) & (1-Sx)\cdot Sy \\ (1-Sy) & 1 & Sy \\ Sx\cdot(1-Sy) & Sx & Sx\cdot Sy \end{bmatrix}.$$

The green image G2 is shifted by half a pixel pitch both in horizontal and in vertical direction, that is:

$$Sx = Sy = \frac{1}{2}.$$

Then the pixel $G2(l, m)$ of the green image G2 located in the l-th row and m-th column, is:

$$G2(l, m) = \sum_{1}^{3}\sum_{1}^{3} \begin{bmatrix} t(i, j) & t(i, j+1) & t(i, j+2) \\ t(i+1, j) & t(i+1, j+1) & t(i+1, j+2) \\ t(i+2, j) & t(i+2, j+1) & t(i+2, j+2) \end{bmatrix} .* \begin{bmatrix} A1 & A2 & A3 \\ A4 & A5 & A6 \\ A7 & A8 & A9 \end{bmatrix}.$$

If the full-resolution high-quality image is composed of 2N×2M pixels, then $$i=1,\ldots,2N-2; j=1,\ldots,2M-2; l=1,\ldots,N;$$
$$m=1,\ldots,M.$$

Thus with the above technique the red, blue and the second green image, namely the R, B and G2 images, are reconstructed, with the following shifts in respect to the reference green image G1:

R channel shifted by (0, ½) of the pixel pitch;
B channel shifted by (½, 0) of the pixel pitch;
G2 shifted by (½, ½) of the pixel pitch.

The corresponding Bayer image (Bayer Pattern or shortly BP) is composed as pictorially shown in FIG. 8. Such a Bayer image is processed according to common techniques (test HQ, classical BP sensor pipeline) in a typical pipeline implementing a color interpolation algorithm to reconstruct the image, an antialiasing and a sharpening step (for example according to the methods disclosed in US2006/087567, U.S. Pat. No. 7,305,123 or EP 1 486 916).

The lenses of the light sensor of this disclosure are precisely oriented to ensure accurately the desired shift. Accurately setting these shifts limits degradation of the PSNR of the reconstructed RGB image.

Sensitivity Analysis to Shift Precision

Figure 17:
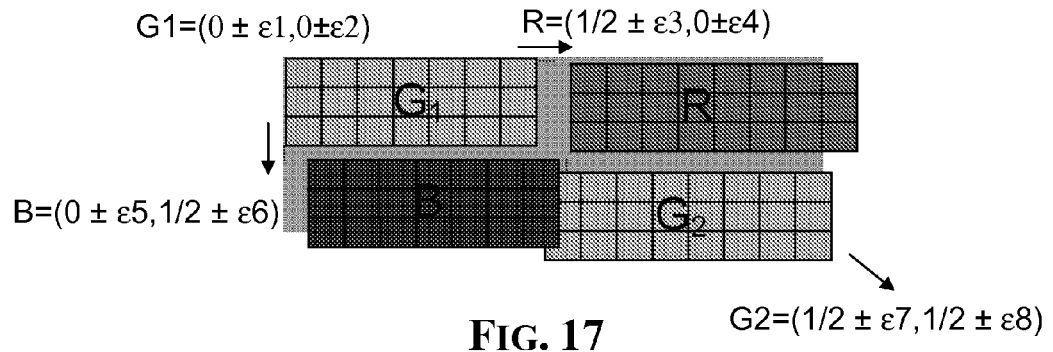
FIG. 17 shows color channels shifted according to the method RGB ½-pixel shift of one embodiment wherein the shift is determined with a random error $\epsilon$.

Considering unavoidable fabrication process spread, lenses of the light sensor of this disclosure as fabricated might not be precisely oriented as desired, thus the shift of the monochromatic R, B and G2 images (or of the green image G2 only according to the alternative embodiment of this disclosure) in both directions would not be exactly equal to half of a pixel pitch, as schematically depicted in FIG. 17. It is therefore important to verify how much the resultant color image would be affected by random errors ($\pm\epsilon$) in implementing the correct shift or shifts.

The monochromatic images R, B and G2, that would be generated with the shift of half a pixel pitch and with a shift affected by the error $\epsilon$, are reconstructed using the above described area interpolation technique. The differences between values of corresponding pixels of the correctly reconstructed image and of the reconstructed error affected image increase the noise of the final RGB image. Such a contribution $D_{G2}(\epsilon)$ for the shifted green image G2_shifted may be evaluated as follows:

$$D_{G2}(\epsilon)=\|G2\_shifted(½,½)-G2\_shifted(½\pm\epsilon_7,½\pm\epsilon_8)\|$$
or
$$D_{G2}(\epsilon)=\|G2\_shifted(½,½)-G2\_shifted(½\pm\epsilon_7,½\mp\epsilon_8)\|.$$

wherein the sign of the error $\epsilon$ is randomly chosen, the values of the error range from 0 to ⅓ and the operator $\|\ldots\|$ represents the Euclidean distance, that is the square root of the squares of each component of its argument.

Corresponding contributions $D_R$ and $D_B$ for the images R and B, respectively, are calculated as illustrated above.

Figure 18:
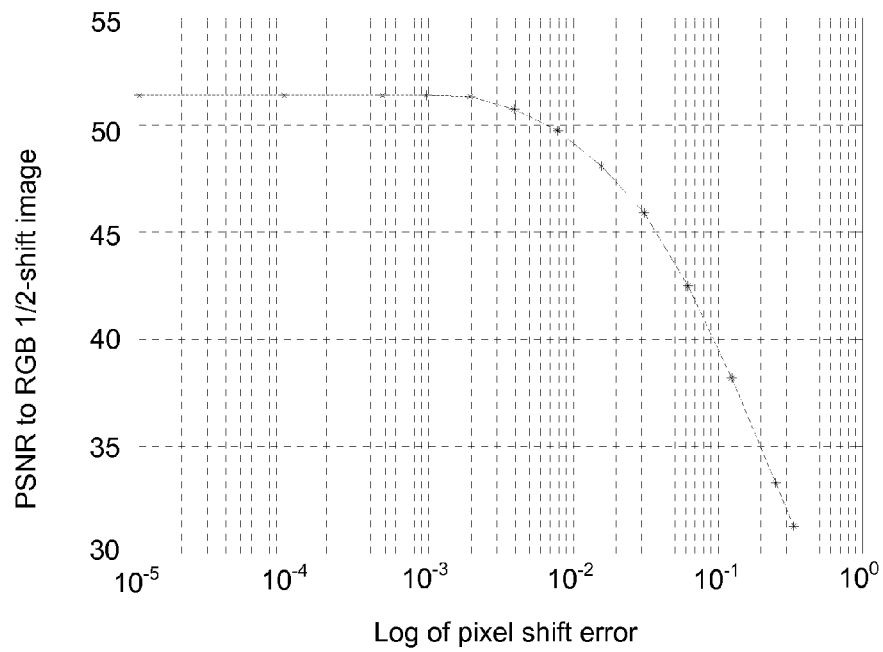
FIG. 18 is a graph of the peak signal-to-noise ratio (PSNR) as a function of the shift error $\epsilon$ for an image obtained with the method RGB ½-pixel shift of one embodiment.

The PSNR of the final RGB image is substantially independent from the sign of the error $\epsilon$. A typical graph of PSNR in function of the logarithm of the error $\epsilon$ is depicted in FIG. 18. For very small values of the error $|\epsilon|$, the PSNR is substantially unaffected, but for errors larger than $2\cdot 10^{-2}$ of the pixel pitch, the PSNR of the final RGB image decreases rapidly.

A minimum PSNR of about 35 dB is commonly considered sufficient for having a well-defined image. Therefore, if the error $|\epsilon|$ is smaller than ¼, the final RGB image will be hardly distinguishable from the same RGB image obtained with $\epsilon$=0.

Figure 19:
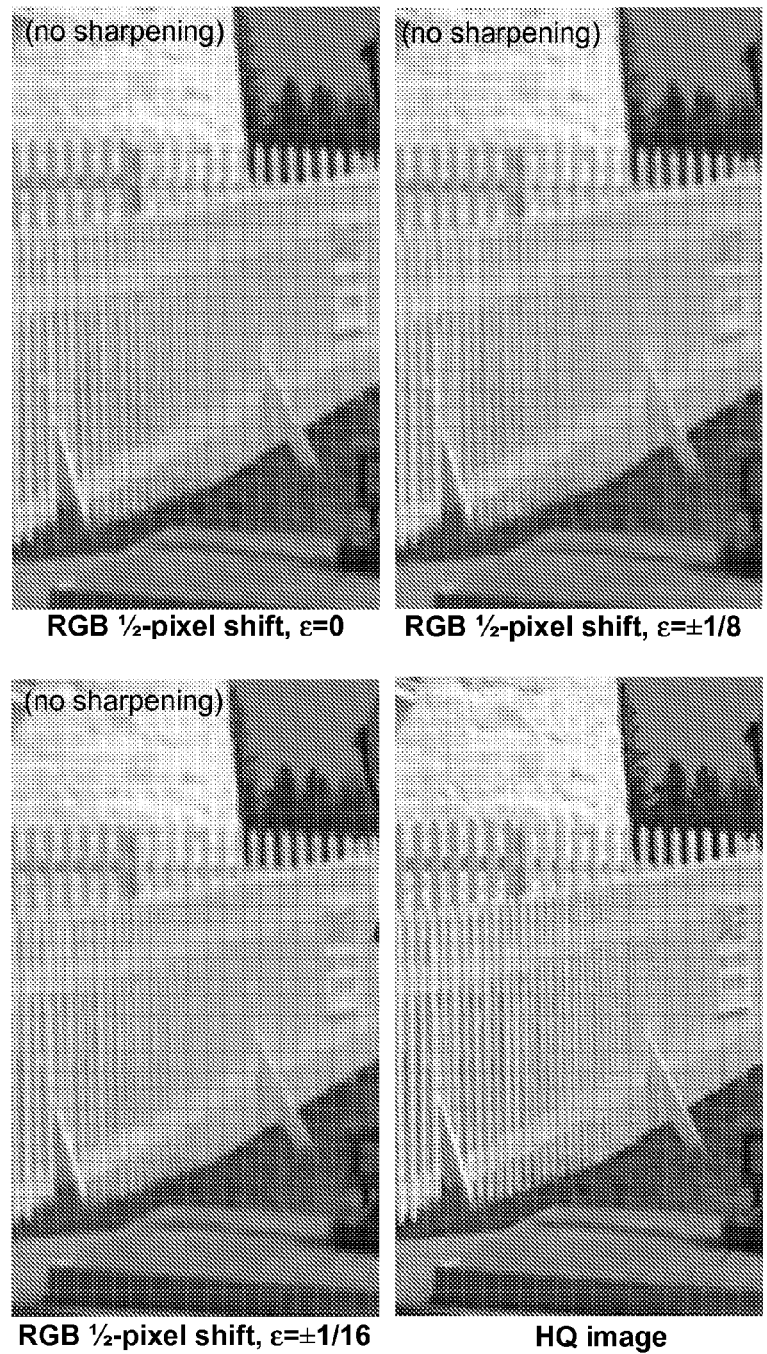
FIG. 19 compares three images obtained with the method RGB ½-pixel shift of this invention for $\epsilon=0$, $\epsilon=\pm 1/16$, $\epsilon=\pm 1/8$ of the pixel pitch with the corresponding high quality image HQ.

FIG. 19 compares three RGB images of the same scene obtained for $|\epsilon|$=0, $|\epsilon|$=¹⁄₁₆ and $|\epsilon|$=⅛ with the corresponding HQ image. Even if the images obtained for $|\epsilon|$=¹⁄₁₆ and $|\epsilon|$=⅛ have a larger PSNR than the image obtained for $|\epsilon|$=0, it is hard to see any difference.

Therefore, in terms of acceptable tolerances in the orientation of the lenses of the light sensor according to this disclosure it will be adequate to make the desired shift with a tolerance not larger than ¼ of the pixel pitch. Similar considerations hold also for the single G ½-pixel shift embodiment.

Comparison

Figure 6:
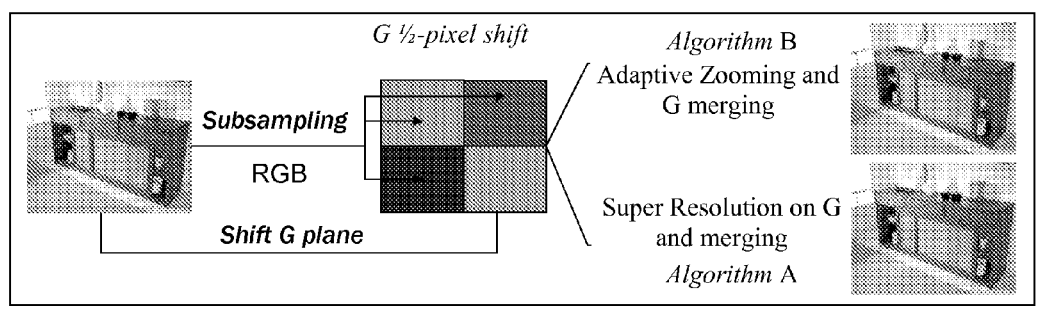
FIG. 6 schematically illustrates two embodiments of the two methods G ½-pixel shift A and B of one embodiment.

The three imaging pipelines of the sensor of this disclosure so far described and depicted in FIGS. 6, 7 and 10, and the two alternative methods for generating LQ and HQ reference images, described in FIGS. 14 and 15, have been compared from three points of view:

complexity and flowchart;
visual comparison;
frequency analysis.

Figure 20:
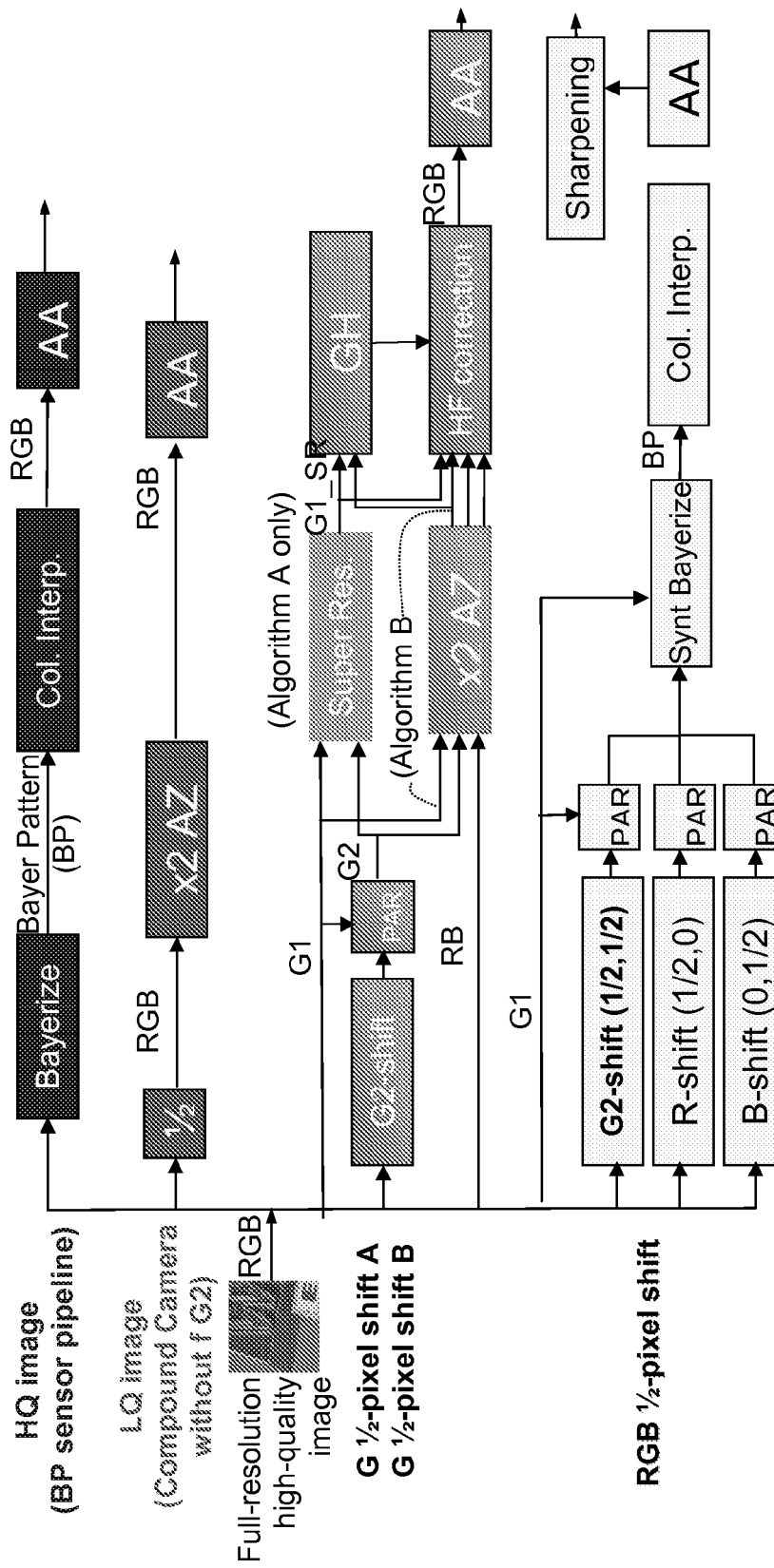
FIG. 20 flowchart comparison of the methods disclosed herein and the methods for obtaining the high quality and low quality reference images.

The different embodiments that have been considered are schematically illustrated all together in FIG. 20.

Flowchart Comparison

From the above description, all the alternative processing pipeline embodiments are a combination of the following common blocks, the first two from top being used only for comparison purposes.

The function of each block is recalled hereinbelow:

Subsampling (½);
Shifting (G2_SHIFT, R_SHIFT, B_SHIFT);
Parallax correction algorithm (PAR)
Bayer pattern extraction (BAYERIZE);
Synthetic Bayer pattern reconstruction (SYNT BAYERIZE);
Color interpolation (COL. INTERP.);
Adaptive zooming (×2 AZ);
Super resolution (SUPER RES.);
High frequency component estimation (GH);
High frequency correction (HF CORRECTION);
Antialiasing (AA);
Sharpening (SHARPENING).

The RGB ½-pixel shift processing approach is of course the simplest to be implemented because no changes in the currently used color interpolation algorithms are required, and for these reasons may be preferable.

Visual Comparison

A wide set of visual comparisons have been extensively analyzed.

Figure 21:
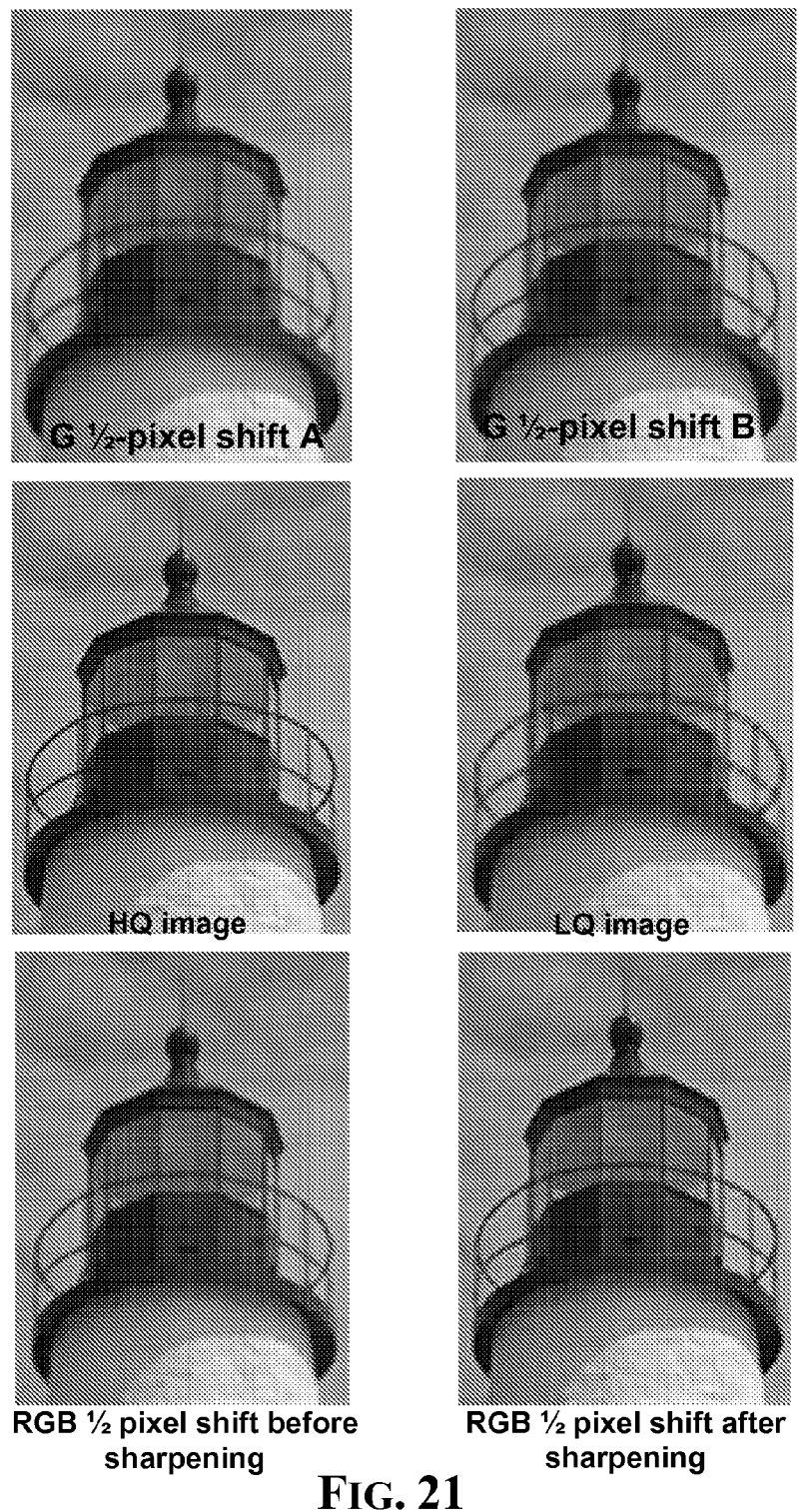
FIG. 21 compares images obtained with the methods G ½-pixel shift A and B and with the method RGB ½-pixel shift disclosed herein with or without sharpening, with high quality HQ and low quality reference images LQ.
Figure 22:
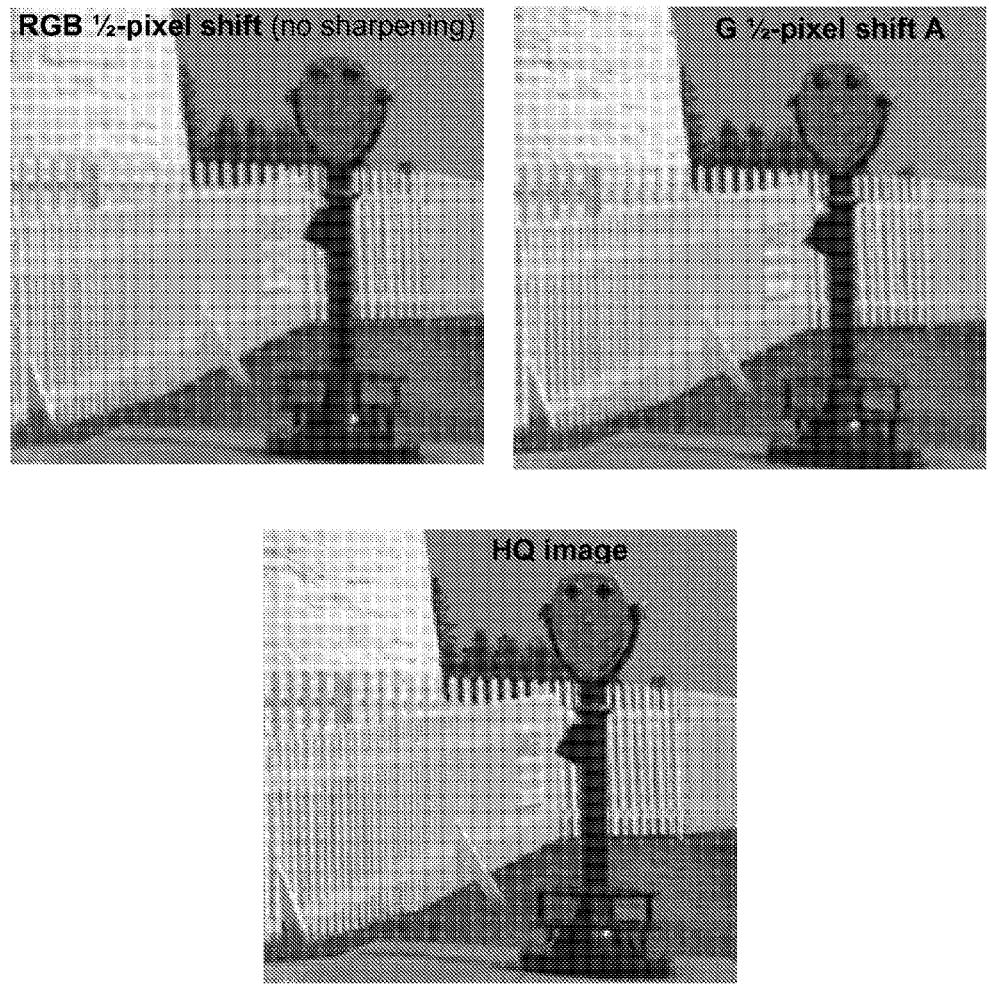
FIG. 22 compares images obtained with the RGB ½-pixel shift method of one embodiment without executing a sharpening operation, with a high quality reference image HQ and an image obtained with the method G ½-pixel shift A of one embodiment.

Each reconstructed image has been compared to the corresponding results of the High Quality reference image (typical Bayer Pattern pipeline) and of the low quality reference image LQ (without using the second green channel G2). Exemplary images obtained with the methods of this disclosure are shown in FIGS. 21, 22 and 19:

G ½-pixel shift A is rather sensitive to the correct motion estimation in the Super Resolution algorithm extracting from G channels the motion vector corresponding to the relative shift between the two channels.
The Super-Resolution step appears to reconstruct correctly and with no color artifacts even at high frequencies;
G ½-pixel shift B introduces some false colors and a visible blurring;
The synthetic Bayer Pattern reconstruction introduces a small blurring effect but no false colors even after a sharpening step;
A small aliasing in the RGB ½-pixel shift is evident; it is due to the small energy of high frequencies (close to Nyquist's frequency).

Frequency Analysis

Given the final interpolated RGB image obtained by composing the interpolated red, green and blue images I_R, I_G and I_B, respectively, the following logarithms of absolute values of Fourier transform were computed for the three color components as follows:

$$F(I\_G)=\log(abs(\text{FFTshift}(\text{FFT2}(I\_G))))$$

wherein 'FFTshift' represents the operation of centering the Fast Fourier Transform FFT to place the highest frequency components in the centre of plot, and FFT2 is the two-dimensional Fast Fourier Transform.

Figure 23:
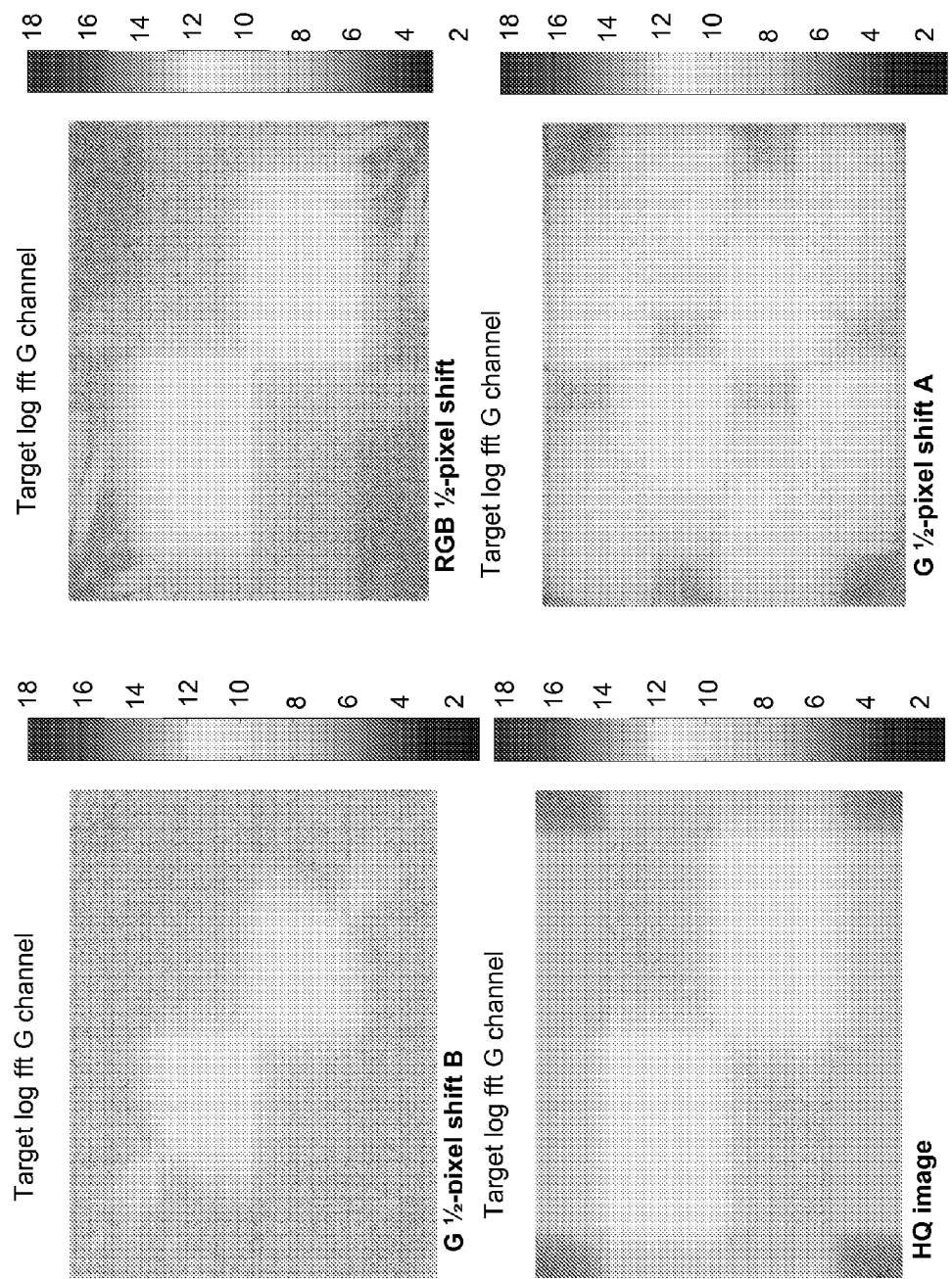
FIG. 23 compares output image spectra of images obtained with the methods G ½-pixel shift A and B and RGB ½-pixel shift and of the corresponding high quality image HQ in which the highest frequency is in the center of picture.

Examples of image spectra of a "chirp" image are depicted in FIG. 23. The spectra of a high quality reference image HQ and of the corresponding images obtained with RGB ½-pixel shift, G ½-pixel shift B and G ½-pixel shift A are compared. As can be seen, RGB ½-pixel shift preserves high frequencies, G ½-pixel shift B shows a loss of high frequencies. It is also evident that G ½-pixel shift A introduces false frequencies.

Figure 24:
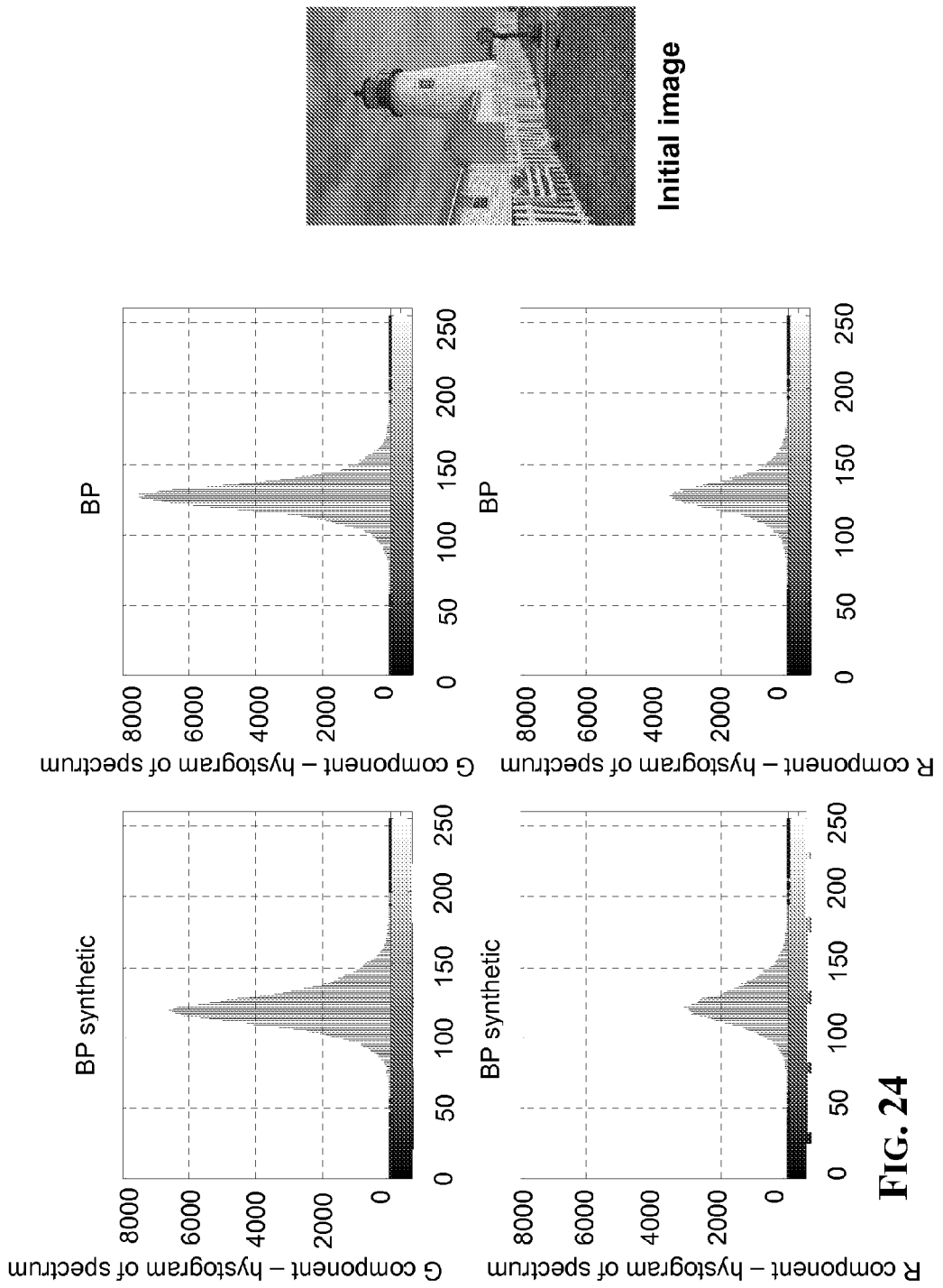
FIG. 24 compares spectra histograms of R and G color channels for a synthetic Bayer pattern obtained with the method RGB ½-pixel shift and a typical Bayer pattern of a high quality reference image HQ.

The histograms of the Fourier transform of the interpolated green and red images are compared in FIG. 24. The histogram FH(I_G) for the green image is:

$$FH(I\_G)=\text{Hist}(256\ F(I\_G)/\max(F(I\_G)))$$

wherein 'Hist' indicates the histogram computation and max(.) the maximum value. A similar formula is used for the red image.

The leftmost histograms relate to artificial Bayer images, the rightmost histogram relate to typical Bayer images. As can be seen in FIG. 24, no frequencies are lost in the reconstruction of synthetic BP, but the energy (contrast) is reduced.

From numerous tests and comparisons in the Fourier domain carried out by the applicants, the following aspects can be outlined.

The behavior at low frequencies is substantially unaltered, the differences being mainly at high frequencies;

When color components of synthetic and normal Bayer patterns are compared, a preliminary small loss of frequencies can be noted in synthetic BP, for G, R and B components. Moreover:

RGB ½-pixel shift preserves high frequencies better than G ½-pixel shift B; G ½-pixel shift A generates undesired high frequency components.

Spectra of G ½-pixel shift A and B and RGB ½-pixel shift have almost the same energy of HQ target test, less refined details, but more power.

Spectra of tests on "chirp" images show a relevant difference between G ½-pixel shift A and B. The G ½-pixel shift B gives less preferred results.

Simple Way of Shifting by Half a Pixel Pitch

Figure 25:
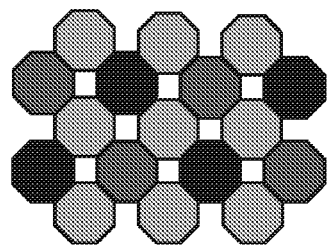
FIG. 25 shows a Bayer pattern configuration rotated by 45 degrees.

According to yet another embodiment of the light sensor of this disclosure, the shift of a fraction of a pixel pitch is obtained by using the organization of the cells of the array of the light sensor depicted in FIG. 25.

Taking in consideration a classic CFA in Bayer configuration, if each pixel is ideally rotated by 45 degrees, a pattern as shown in FIG. 25 is obtained.

This peculiar pattern configuration can be exploited to shift (space among each other) in a surprisingly easily manner the four regions by orienting the lenses of the sensor such to shade off one row/column or an odd number of rows/columns of cells, that remain unused.

Figure 26:
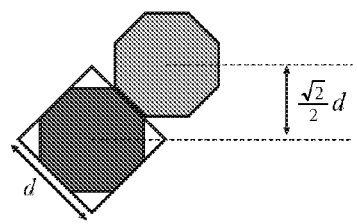
FIG. 26 illustrates how to dispose diagonally two pixels for obtaining a displacement d between two adjacent pixels.

As shown in FIG. 26, using a such configuration, the displacement between two adjacent pixels is d'=sqrt(0.5)*d, wherein sqrt(2)*d is the pixel pitch (assuming for simplicity a square pixel).

This displacement in a 45 degree orientation is technologically simple to obtain. In fact images generated by two neighboring cell arrays will be shifted by half a pixel pitch just by simply shading some pixels at the border within the two monochromatic arrays, as shown in FIG. 27.

In practice, the cells of the array are organized in singularly addressable rows and columns, wherein odd rows of cells are staggered in respect to even rows of cells and odd columns of cells are staggered in respect to even columns of cells, such that the distance between any pixel and the neighboring pixels belonging to the same row or to the same column (i.e. the pixel pitch) is a multiple by the square root of two of the distance between said pixel and any of the closest pixels adjacent thereto.

Figure 27:
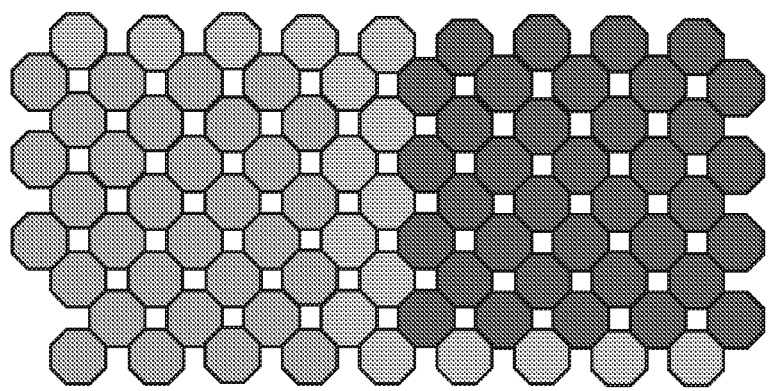
FIG. 27 shows how to shift a monochromatic image by a fraction of a pixel pitch in a light sensor with a cell array rotated by 45 degrees.

If the cells of the arrays are oriented in this way, referred hereinafter as the "45 degrees orientation", a shift of half a pixel pitch may be more easily obtained by leaving unused one or an odd number of columns (rows) of cells as depicted in FIG. 27.

In order to better understand this aspect of this disclosure, let us consider the Figures from 28 to 31.

Figure 28:
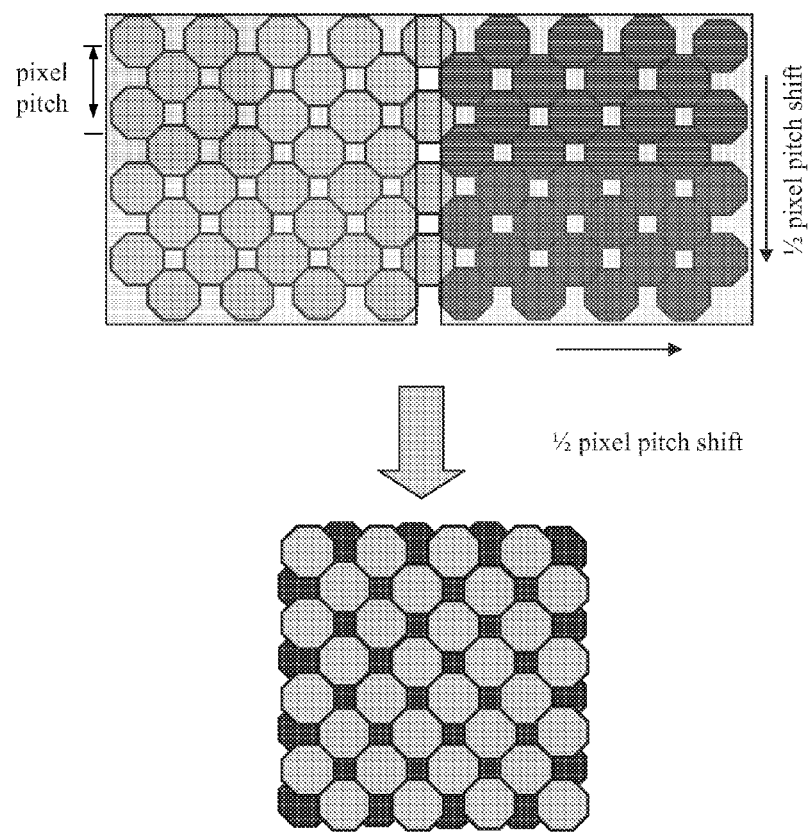
FIG. 28 shows how to obtain a shift of half a pixel pitch by leaving unused a column of cells of the array between the reference green image and the blue image.

FIG. 28 depicts two "45 degrees oriented" cell arrays, wherein a column of cells is shaded for obtaining the desired shift of half a pixel pitch. By ideally superposing the two cell arrays, the configuration in the lower part of FIG. 28 is obtained, in which green and red pixels are interleaved.

Figure 29:
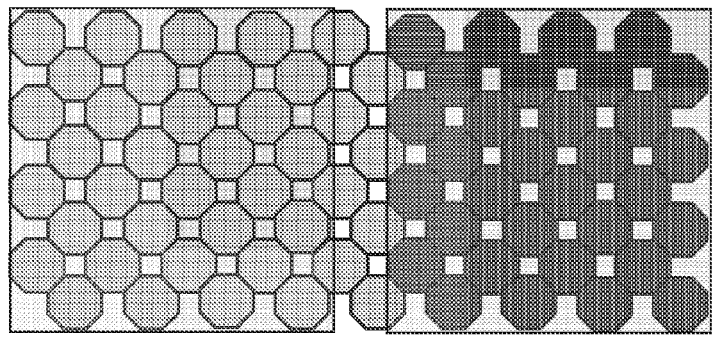
FIG. 29 shows why no shift is obtained by leaving unused two columns of cells of the array between the reference green image and the blue image.

It is necessary to shade only one column (row) or an odd number of columns (rows), otherwise no shift would be introduced. As shown in FIG. 29, by shading two columns (or an even number thereof) the two cell arrays would perfectly superpose one on the other and no shift will be introduced.

Figure 30:
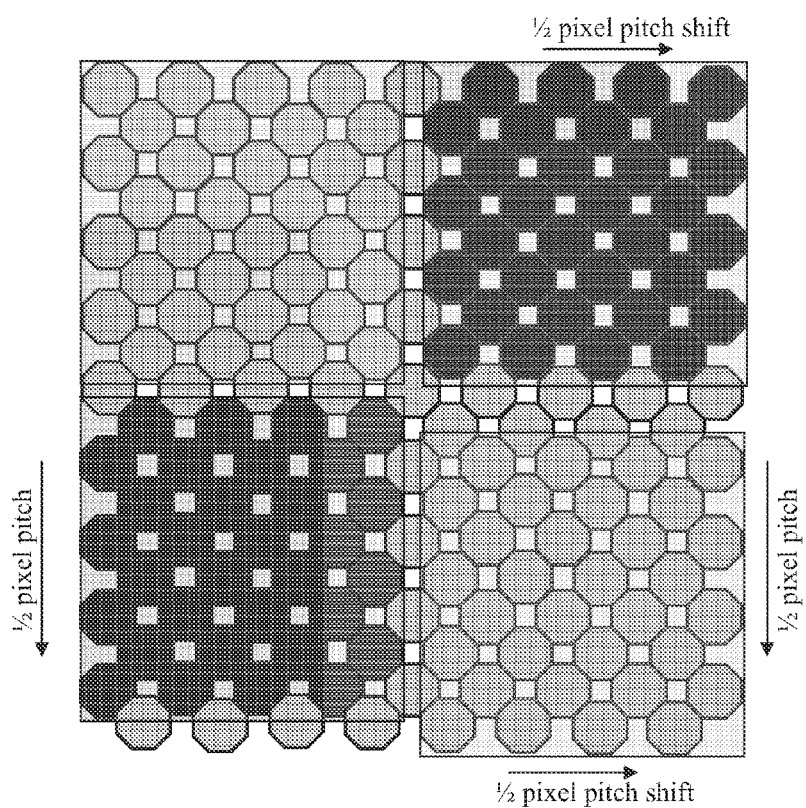
FIG. 30 shows how the lenses should be oriented for obtaining red, blue and green images shifted by half a pixel pitch in respect to the reference green image in a light sensor with a cell array rotated by 45 degrees.
Figure 31:
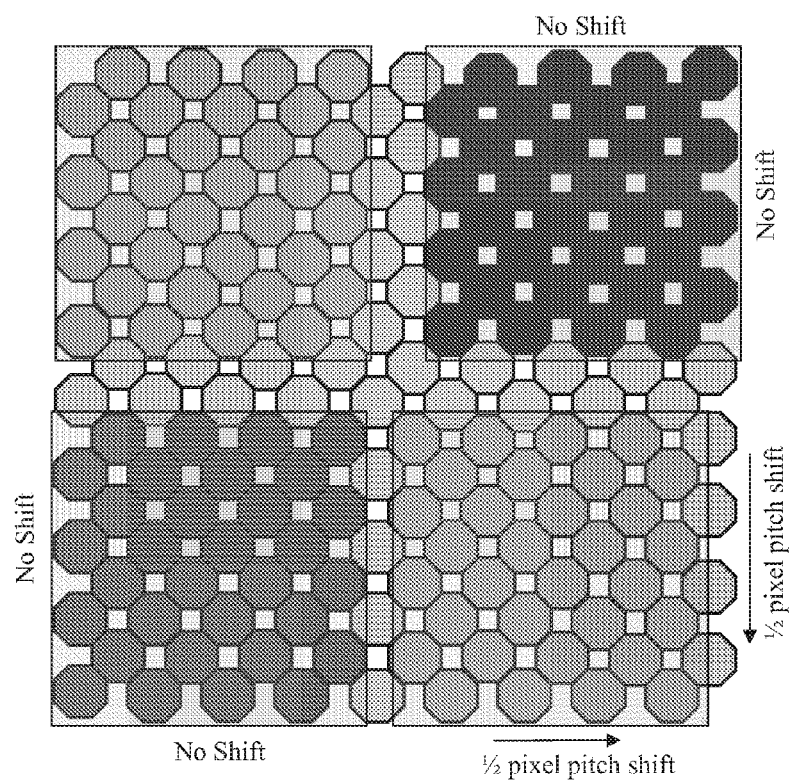
FIG. 31 shows how the lenses should be oriented for obtaining a green image shifted by half a pixel pitch in respect to the reference green image in a light sensor with a cell array rotated by 45 degrees.

The shifts a) and b) illustrated in FIG. 3 may be easily realized using a "45 degrees oriented" cell array by shading rows and columns as depicted in FIGS. 30 and 31, respectively.

Extended Depth of Field

Figure 32:
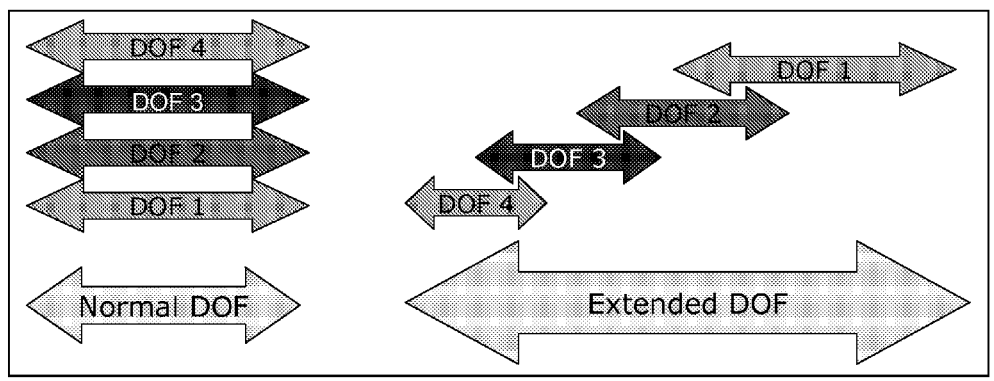
FIG. 32 compares a depth of field of a common compound camera sensor (Normal DOF) and the depth of field (Extended DOF) obtainable with a light sensor of this invention.

According to yet another important embodiment of the light sensor of this disclosure is depicted in FIG. 32. According to this embodiment, the four lenses are at different distances from the respective cell array, each monochromatic image will have objects in focus that are at different distances from the camera. The depth of field can be extended by positioning each lens such that its depth of field range differs from the depth of field ranges of the other lenses and all the four different ranges may preferably be staggered without gaps between them. By a consequent data processing sequence in the pipeline, the focus range will be the sum of the four focus ranges of the lenses.

Figure 33:
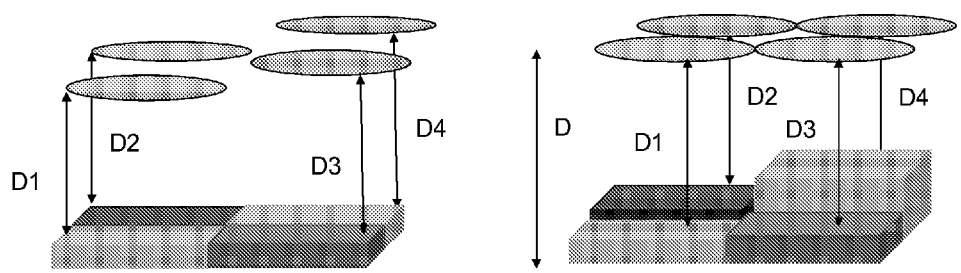
FIG. 33 illustrates two embodiments of a light sensor with extended depth of field.

A significant extension of the depth of field can be obtained either by disposing the four lenses at different distances from the respective cell array or by realizing a sensor where the four cell arrays do not lay on the same plane. In the latter case, the four lenses may be formed on a same plane using the usual fabrication technique. In FIG. 33 are illustrated two possible arrangements of a light sensor of this disclosure with extended depth of field (or more briefly EDOF).

Of course, the different depth of field ranges may even be staggered with gaps among them and therefore the compound depth of field can be extended even further by employing an inverse filtering technique. More specifically, objects placed at a distance that corresponds to a gap between two adjacent depths of fields ranges will be slightly out of focus in the captured image. However, such a slight blur may be effectively corrected and a sharp image may be generated by processing the captured blurred image with a high pass filter purposely designed by using the so-called Point Spread Function (PSF) of the lenses. An exemplary realization of a high pass filter defined using the Point Spread Function of the lenses is illustrated hereinafter.

Figure 34:
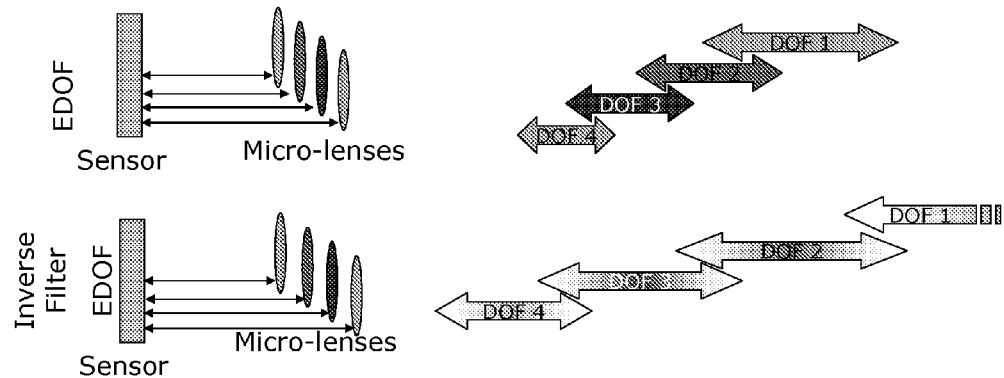
FIG. 34 illustrates how the distances of the lenses from the array are to be staggered according to two embodiments.

FIG. 34 compares the cases in which the ranges of depth of fields are staggered without gaps between them (Standard EDOF), when using the preferred EDOF light sensor structure, and with gaps (Inverse Filter EDOF), when using an Inverse Filter EDOF light sensor structure. In the latter case, objects placed at a distance corresponding to a gap between two depth of field ranges are affected by blur and thus sharpness of the reconstructed image must be restored by an inverse filtering step.

Figure 35:
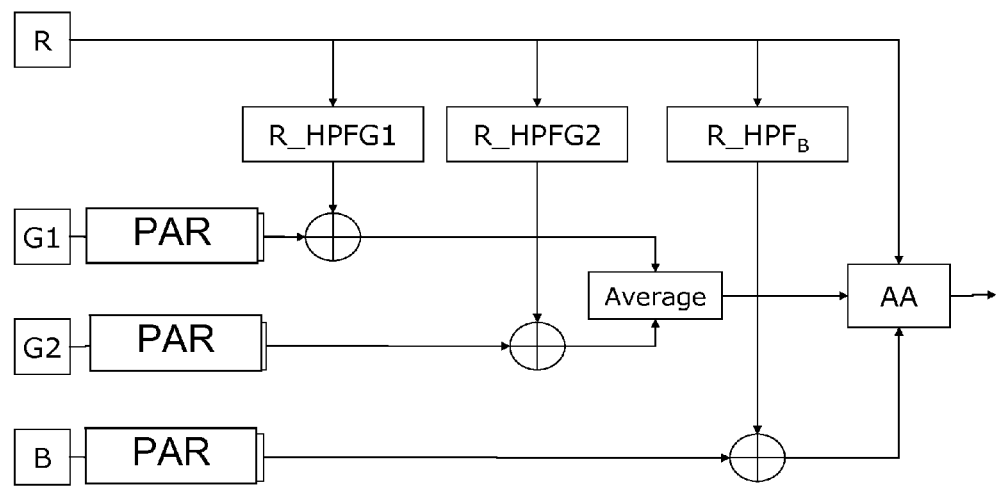
FIG. 35 illustrates an algorithm of this invention for generating a sharp image with an extended depth of field.

A preferred embodiment of an image reconstruction algorithm for an EDOF light sensor of this disclosure is described hereinbelow referring to FIG. 35.

The blocks PAR are not strictly necessary. They may conveniently be used for filtering out eventual unwanted parallax effects. This may be the case when the lenses of the EDOF light sensor are oriented such to generate monochromatic images G2 (or also R and B) shifted by half a pixel pitch in respect to a reference green image G1.

The staggered depth of filed embodiment of the compound light sensor of this disclosure rests on the principle that wherever an object may be positioned with respect to the four lens, at least one of the four monochromatic images of the sensor will be in focus (sharp). The high frequency components of the sharp image are then added to the other out-of-focus images such that, at the end of the pixel data processing pipeline, all the four monochromatic images are equally sharp (well focused).

According to the consequent method of this disclosure, the sharpest image is identified among the captured R, B, G1 and G2 images, using a high pass filter. There are many known methods to select the sharpest image in a set of images of a same captured scene, based on filters that extract the high frequencies in the image [6]. An exemplary effective method to select the sharpest image, suitable for being used with the proposed method of this disclosure, is disclosed in [7].

Mathematical models of the lenses are known as well as their Point Spread Functions (PSF), thus a low pass filtered image (LPF) can be generated for each monochromatic image with well-known techniques. These LPF images can be used to estimate the amount of blurring between the identified sharpest image and each of the out-of-focus images.

Assuming that the red image R be the sharpest image, the high frequency image HG1 to be summed to G1 is:

$$HG1=R-R\_LPF_{G1}$$

wherein $R\_LPF_{G1}$ is a low-pass filtered replica of the image R and the low-pass filter function applied to the image R is the PSF defined by the difference between the distances of the lenses of the channels R and G1 from the respective cell array:

$$R\_LPF_{G1}=PSF_{R-G1}(R).$$

Similar considerations are repeated for the other monochromatic second green G2 and blue B images:

$$HG2=R-R\_LPF_{G2}$$

$$HB=R-R\_LPF_B$$

wherein HG2 and HB are the high frequencies images of the green G2 and blue B images.

Alternatively, the high frequency images HG1, HG2 and B can be obtained as follows:

$$HG1=R\_HPF_{G1}$$

$$HG2=R\_HPF_{G2}$$

$$HB=R\_HPF_B$$

wherein $R\_HPF_{G1}$ is output of a high pass filter applied to the red image R defined as follows $$R\_HPF_{G1}=1-PSF_{R-G1}(R).$$

Sharp monochromatic images G1*, G2* and B* can thus be obtained from the three blurred images G1, G2 and B as follows:

$$G1*=G1+HG1$$

$$G2*=G2+HG2$$

$$B*=B+HB$$

The final RGB image is obtained by combining the following sharp monochromatic images:

$$R;(G1*+G2*)/2;B*$$

according to any common interpolation method. Same considerations hold when the sharpest image is G1, or G2 or B.

If the ranges of depth of field are staggered with gaps, it may happen that objects placed at a distance not comprised in a range be slightly out-of-focus. In this case, according to this embodiment of the disclosure, the less blurred image is sharpened using a filtering operation defined in function of the Point Spread Function of the lens. An exemplary sharpening step that may be used in connection with the method of this disclosure is disclosed in the U.S. Pat. No. 7,065,256, the disclosure of which is herein incorporated by reference.

More in detail, the less blurred image among the four monochromatic images is selected. This operation may be carried out as in the EDOF algorithm of this disclosure without gaps. Once the less blurred monochromatic image has been identified (let us suppose that it is the red image R), it is corrected for reducing blurring using a typical sharpening filter that enhances high frequency components of the image. Such a sharpening filter may be as disclosed in the patent [26] or may be defined by the inverse function of the point spread function of the lens. The corrected image R' is a sharp image and the method steps illustrated referring to the EDOF algorithm without gaps apply to the images G1, G2, B and the corrected image R'.

According to yet another possible embodiment of the compound sensor of this disclosure, the lenses of the G1 and G2 cell arrays may be at the same distance from the arrays but have different optical characteristics such that the lenses focusing the image on the R and B cell arrays have staggered depth of field ranges in respect to the depth of field range of the lenses focusing the image on the G1 and G2 arrays.

In practice, the shifting the four monochromatic images by ½ of the pixel pitch may be implemented separately or together with the above discussed arrangements for extending the depth of field, and vice versa.

If the lenses of an EDOF light sensor embodiment of this disclosure are oriented such to shift by half a pixel pitch the monochromatic images, as previously described, the block of anti aliasing AA in FIG. 20 will be substituted by a block for executing the algorithm of combining monochromatic images shifted by half of a pixel pitch.

In FIG. 20 are grouped the block diagrams of the described image processing algorithms. The block AA represents the final anti-aliasing step carried out according to any of the many well established known techniques.

REFERENCES

[1] S. Omori and K. Ueda, High-resolution image using several sampling-phase shifted images—density doubling of single chip color CCD with pixel-shift technique, IEEE, 2000, pp. 178-179.
[2] C. Kim, S. Seong, J. Lee and L. Kim Winscale, An Image-Scaling Algorithm Using an Area Pixel Model *IEEE Transaction on Circuits and Systems for Video Technology* Vol 13, No 6 Jun. 2003
[3] L. Wang, Y, Zhang and J. Feng On the Euclidean Distance of Images *IEEE Transaction on Pattern Analysis and Machine Intelligence*, Vol 27, No 8 Aug. 2005
[4] Ichiro Oyama, Tomokuni Iijima, Katsumi Imada, et al., Distance Detective Small Camera Module, *Sensors, Cameras, and Systems for Scientific/Industrial Applications VIII Proc. of SPIE-IS&T Electronic Imaging, SPIE Vol.* 6501, 21 Feb. 2007
[5] Michiyoshi Nagashima, Masa-aki Suzuki, Tsuguhiro Korenaga, et al., New camera module with thin structure, high resolution and distance-detection capability, *Photonics in Multimedia, Proceedings of SPIE Vol.* 6196, *Proceedings of SPIE Vol.* 6196
[6] Rafael C. Gonzalez, Richard E. Woods, Digital Image Processing, Second Edition, *Prentice Hall* 2001, ISBN 0-201-18075-8, pp. 125-142
[7] Kang-Sun Choi, Jun-Suk Lee, Sung-Jae Ko, New autofocusing technique using the frequency selective weighted median filter for video cameras, *Consumer Electronics, IEEE Transactions on Volume:* 45 Issue: 3 Aug. 1999, Page(s): 820-827.
[8] US 2005/0128335.
[9] US 2005/0128509.
[10] U.S. Pat. No. 6,983,080.
[11] U.S. Pat. No. 6,753,906.
[12] U.S. Pat. No. 6,803,949.
[13] U.S. Pat. No. 6,678,000.
[14] US 2004/0196379.
[15] U.S. Pat. No. 6,137,535.
[16] U.S. Pat. No. 5,812,322.
[17] U.S. Pat. No. 6,053,408.
[18] U.S. Pat. No. 6,765,617.
[19] U.S. Pat. No. 6,782,143.
[20] U.S. Pat. No. 6,958,862.
[21] U.S. Pat. No. 7,260,277.
[22] US 2004/0196379.
[23] US2006/087567.
[24] U.S. Pat. No. 7,305,123.
[25] EP 1 486 916.
[26] U.S. Pat. No. 7,065,256.
[27] U.S. Pat. No. 4,558,365.
[28] U.S. Pat. No. 4,602,289.
[29] U.S. Pat. No. 6,236,434.
[30] US 2008/0043125.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A light sensor for capturing an image of a scene, comprising:
    a multi-cell photo-detector composed of a plurality of cell arrays of cells, each cell defining a pixel and being configured to generate an electric signal representative of an intensity of light impinging thereon;
    a plurality of lenses, each of the plurality of lenses configured to capture an image having a similar field of view of the scene and focus the light coming from the scene on a corresponding cell array of the plurality of cell arrays, respectively, wherein said lenses lay in a same plane and said cell arrays are defined on different planes; and
    wherein each of said plurality of lenses is placed a different physical distance from the corresponding cell array, has a focal point on the corresponding cell array, and defines a depth of field with respect to the correspond cell array that is different from the depths of field defined by the other lenses for the other corresponding cell arrays, said depths of field being staggered.

2. The light sensor of claim 1, wherein said depths of field are staggered without gaps.

3. The light sensor of claim 1, wherein said depths of field are staggered with gaps.

4. The light sensor of claim 1, wherein the plurality of lenses includes four lenses, and the plurality of cell arrays includes a first cell array sensitive to red light, a second cell array sensitive to blue light, and third and fourth cell arrays sensitive to green light, disposed according to a Bayer pattern.

5. The light sensor of claim 4, wherein the lenses focusing light on said third and fourth cells arrays are the closest and the farthest from the respective cell arrays.

6. The light sensor of claim 4, further comprising a processing pipeline coupled to said cell arrays and configured to elaborate image pixels captured by said cell arrays and to output a corresponding Bayer image.

7. The light sensor of claim 1 wherein:
    the focal point of the image on a first of the plurality of cell arrays is shifted by one-half pixel horizontally and one-half pixel vertically from the focal points of each of the remaining images on each one of the respective remaining plurality of cell arrays; and
    the focal points of each of the remaining images on each one of the respective remaining plurality of cell arrays are aligned.

8. A light sensor for capturing an image of a scene, comprising:
    a multi-cell photo-detector including first, second, third, and fourth cell arrays of cells, each cell configured to define a pixel and being configured to generate an electric signal representative of an intensity of light impinging thereon; and
    four lenses, each configured to focus light from the scene and provide respective images of the scene at focal points located on respective ones of the first, second, third, and fourth cell arrays;
    wherein the focal points of images of the scene on the first, second, and third cell arrays are aligned with respect to the first, second, and third cell arrays, respectively, and the focal point of the image of the scene on the fourth cell array is shifted by one-half pixel horizontally and one-half pixel vertically with respect to the focal points of each of the images of the scene on the first, second, and third cell arrays;

wherein each of the four lenses is configured to capture a similar field of view of the scene;

wherein each of the four lenses is placed at a different physical distance from a corresponding one of the plurality of cell arrays;

wherein each of the four lenses has different optical properties such that each lens focuses the light coming from the scene on the corresponding cell array; and wherein each of the four lenses defines a respective depth of field that differs from the depths of field defined by each of the remaining lenses, said depths of field defined by the four lenses being staggered.

9. The light sensor of claim 8, wherein the first cell array includes a cell array sensitive to impinging red light, the second cell array includes a cell array sensitive to impinging blue light, and the third and the fourth cell arrays include cell arrays sensitive to impinging green light.

10. The light sensor of claim 9 wherein the cell arrays are disposed according to a Bayer pattern.

11. The light sensor of claim 8, wherein said depths of field are staggered without gaps.

12. The light sensor of claim 8, wherein said depths of field are staggered with gaps.

13. The light sensor of claim 8, wherein said lenses lay in a same plane and said cell arrays are defined on different planes.

14. The light sensor of claim 8, wherein said cell arrays are defined on a same plane and said lenses lay in different planes.

* * * * *